United States Patent [19]
Kawasumi et al.

[11] Patent Number: 5,766,508
[45] Date of Patent: Jun. 16, 1998

[54] LIQUID CRYSTAL COMPOSITION

[75] Inventors: Masaya Kawasumi; Naoki Hasegawa; Arimitsu Usuki; Akane Okada; Masaaki Tani; Yoshiaki Fukushima, all of Aichi, Japan

[73] Assignee: Kabushiki Kaisha Toyota Chuo Kenkyusho, Aichi-ken, Japan

[21] Appl. No.: 593,888

[22] Filed: Jan. 30, 1996

[30] Foreign Application Priority Data

Jan. 31, 1995 [JP] Japan ................................. 7-036077
Sep. 25, 1995 [JP] Japan ................................. 7-271835

[51] Int. Cl.$^6$ ................................. C09K 19/52; C09K 19/54; G02F 1/13
[52] U.S. Cl. ................................. 252/299.01; 252/299.5; 428/1; 349/89; 349/117; 349/92
[58] Field of Search ................................. 252/299.01, 299.1, 252/299.5; 349/89, 91, 117, 92; 428/1

[56] References Cited

U.S. PATENT DOCUMENTS 5,216,531  6/1993  Hirai et al. ................................. 359/52
5,645,758  7/1997  Kawasumi et al. ................................. 252/299.01

*Primary Examiner*—Shean C. Wu
*Attorney, Agent, or Firm*—Oblon, Spivak, McClelland, Maier & Neustadt, P.C.

[57] ABSTRACT

This invention provides liquid crystal compositions for light controlling materials of light scattering type having both memory and high speed response characteristics. The composition neither needs a temperature controlling device nor a device for imparting a shear stress as a memory erasing device, because the composition comprises a two-frequency addressing liquid crystal or such liquid crystal with an ionic component.

The two-frequency addressing liquid crystal responds to an electric field and exhibits a positive dielectric anisotropy or a negative dielectric anisotropy depending on the frequency region of the electric field. Because the flat shaped particles of the present invention exhibit an affinity with the liquid crystal, the particles are dispersed in the liquid crystal and form liquid crystal domains effectively.

15 Claims, 23 Drawing Sheets

F I G. 6
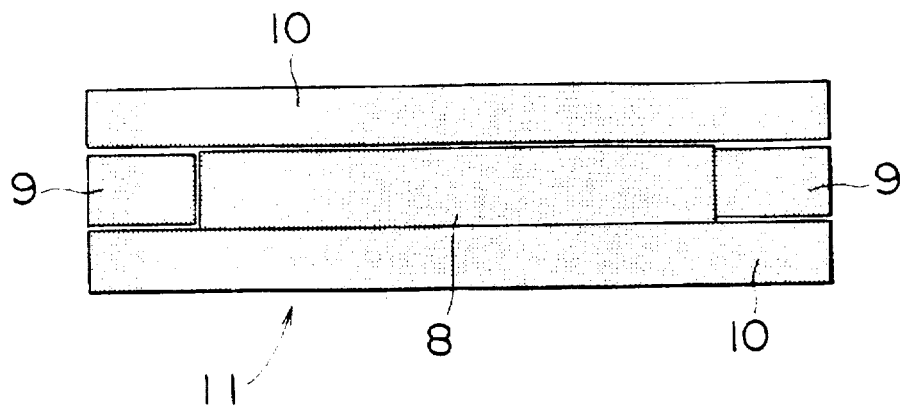
F I G. 7
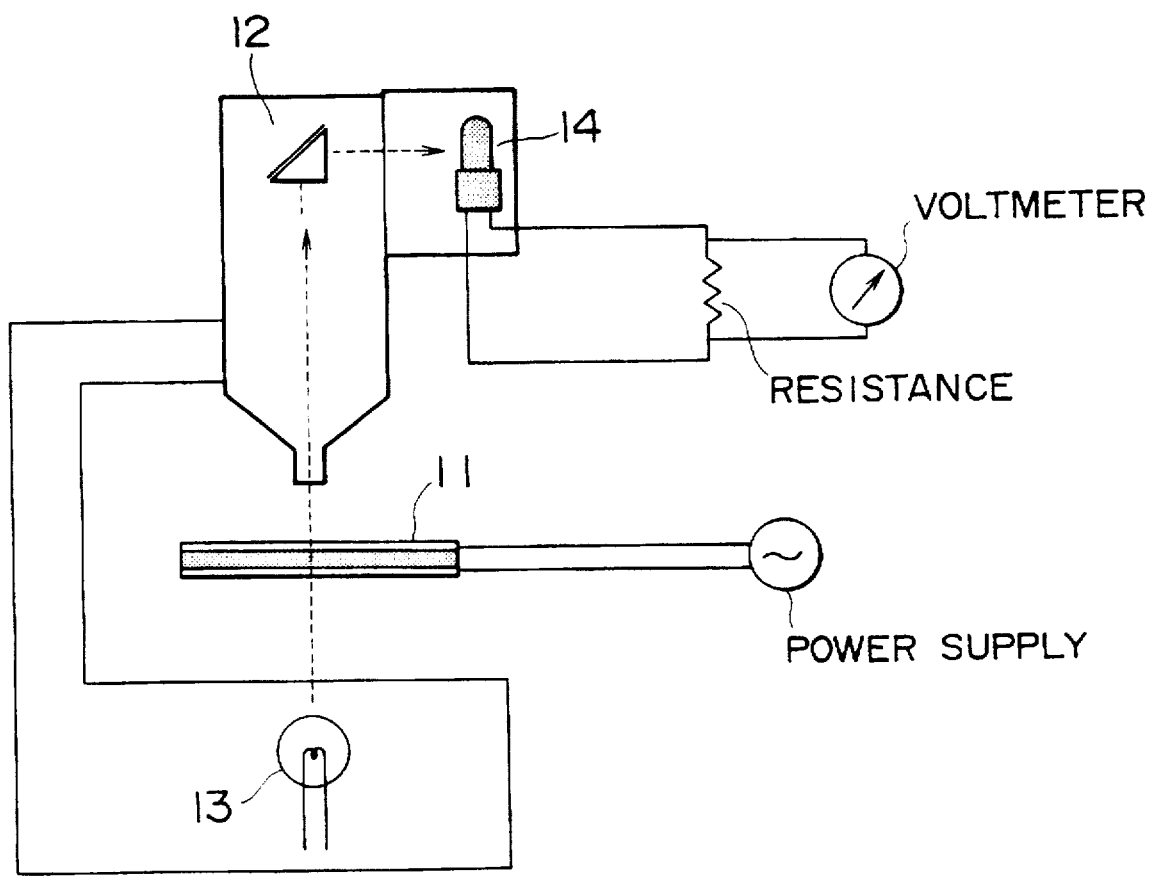

R₁: $CH_3-(CH_2)_n-$
R₂: $CH_3-(CH_2)_m-$   $n, m = 1-16$

R₃: $CH_3-(CH_2)_n-$
R₄: $CH_3-(CH_2)_m-$   $n, m = 1-16$

R₅: $CH_3-(CH_2)_n-$
R₆: $CH_3-(CH_2)_m-$   $n, m = 1-16$ $R_7$: $CH_3-(CH_2)_n-$
$R_8$: $CH_3-(CH_2)_m-$     $n, m = 1-16$ $R_9$: $CH_3-(CH_2)_n-$
$R_{10}$: $CH_3-(CH_2)_m-$     $n, m = 1-16$ $R_{11}$: $CH_3-(CH_2)_n-$
$R_{12}$: $CH_3-(CH_2)_m-$     $n, m = 1-16$ $R_{13}$: $CH_3-(CH_2)_n-$  $\quad n = 1-16$ $R_{14}$: $CH_3-(CH_2)_n-$  $\quad n = 1-16$ $R_{15}$: $CH_3-(CH_2)_n-$  $\quad n = 1-16$

FIG. 18
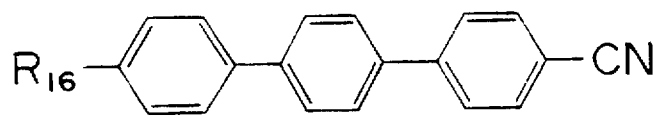
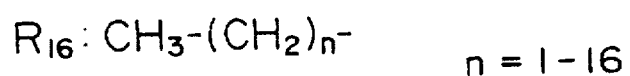
$R_{16}$: $CH_3-(CH_2)_n-$    $n = 1-16$
FIG. 19
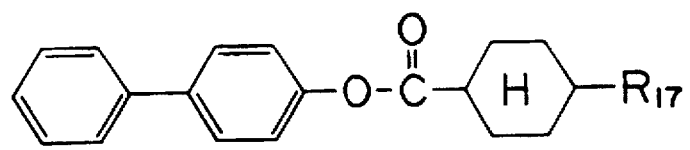
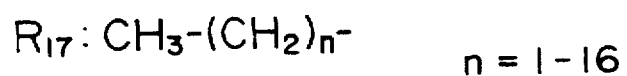
$R_{17}$: $CH_3-(CH_2)_n-$    $n = 1-16$
FIG. 20
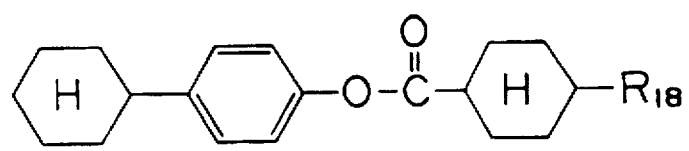
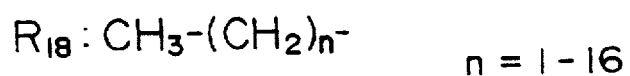
$R_{18}$: $CH_3-(CH_2)_n-$    $n = 1-16$ $R_{18}$ : $CH_3-(CH_2)_n-$
$R_{19}$ : $CH_3-(CH_2)_m-$ $n = 1-16$
$m = 1-16$ $R_{20}$ : $CH_3-(CH_2)_n-$
$R_{21}$ : $CH_3-(CH_2)_m-$ $n = 1-16$
$m = 1-16$ $R_{22}$ : $CH_3-(CH_2)_n-$
$R_{23}$ : $CH_3-(CH_2)_m-$ $n = 1-16$
$m = 1-16$ R$_{24}$: CH$_3$-(CH$_2$)$_n$-
R$_{25}$: CH$_3$-(CH$_2$)$_m$- n = 1-16
m = 1-16

R$_{26}$: CH$_3$-(CH$_2$)$_n$-
R$_{27}$: CH$_3$-(CH$_2$)$_m$- n = 1-16
m = 1-16

R$_{28}$: CH$_3$-(CH$_2$)$_n$-
R$_{29}$: CH$_3$-(CH$_2$)$_m$- n = 1-16
m = 1-16

$R_{30}$: $CH_3$-$(CH_2)_n$-
$R_{31}$: $CH_3$-$(CH_2)_m$- n = 1 - 16
m = 1 - 16

$R_{32}$: $CH_3$-$(CH_2)_n$-
$R_{33}$: $CH_3$-$(CH_2)_m$- n = 1 - 16
m = 1 - 16

$R_{34}$: $CH_3$-$(CH_2)_n$-
$R_{35}$: $CH_3$-$(CH_2)_m$- n = 1 - 16
m = 1 - 16

$R_{36}: CH_3-(CH_2)_n-$  $n = 1-16$ $R_{37}: CH_3-(CH_2)_n-$  $n = 1-16$ $R_{38}: CH_3-(CH_2)_n-$  $n = 1-16$

F I G. 37
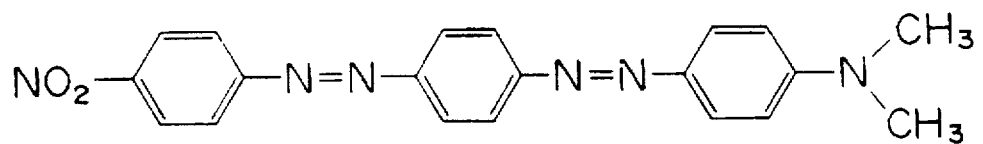
F I G. 38
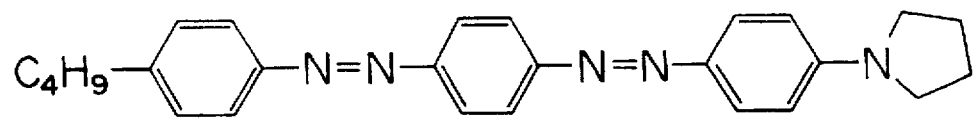
F I G. 39
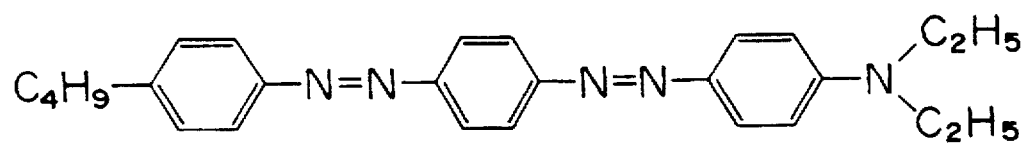
F I G. 40
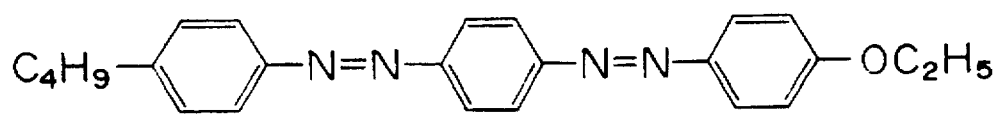

F I G. 41
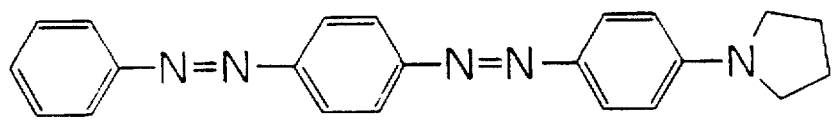
F I G. 42
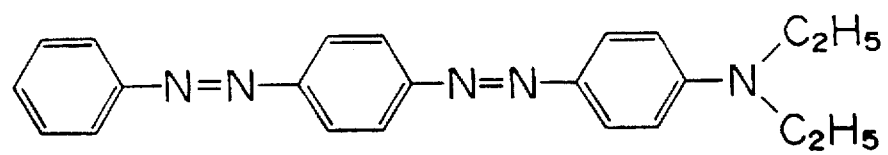
F I G. 43
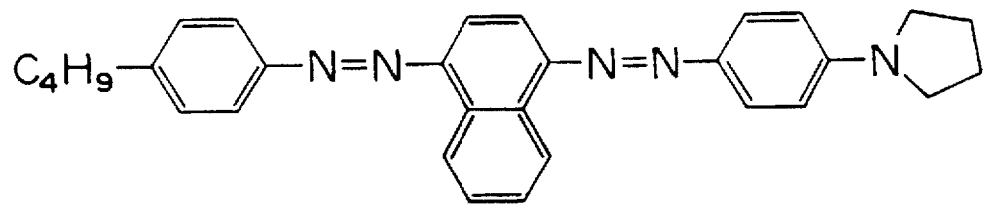
F I G. 44
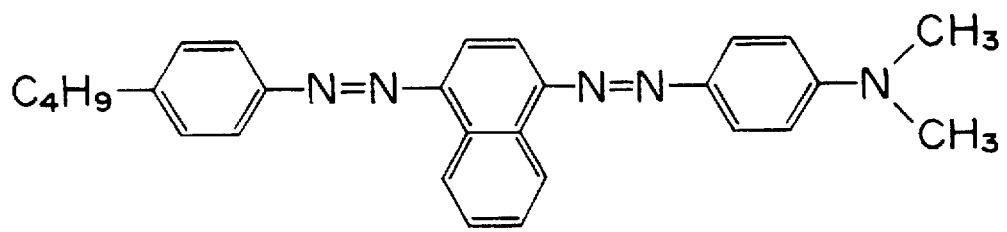

F I G. 57
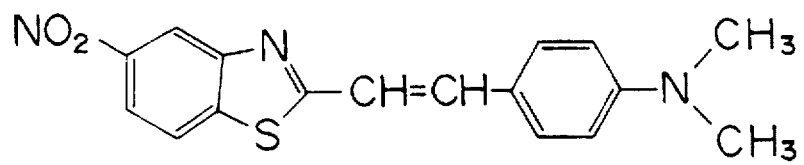
F I G. 58
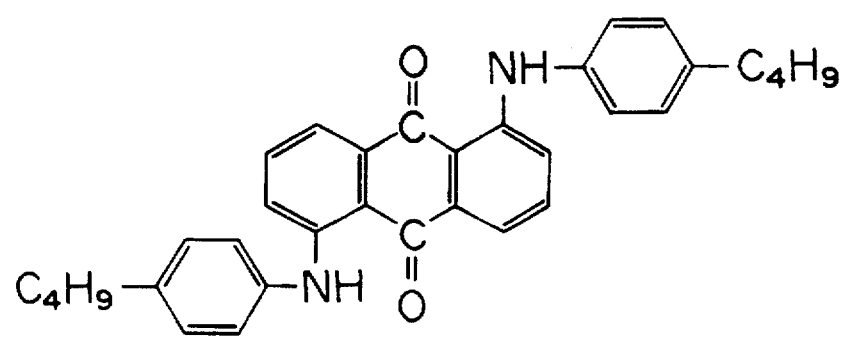
F I G. 59
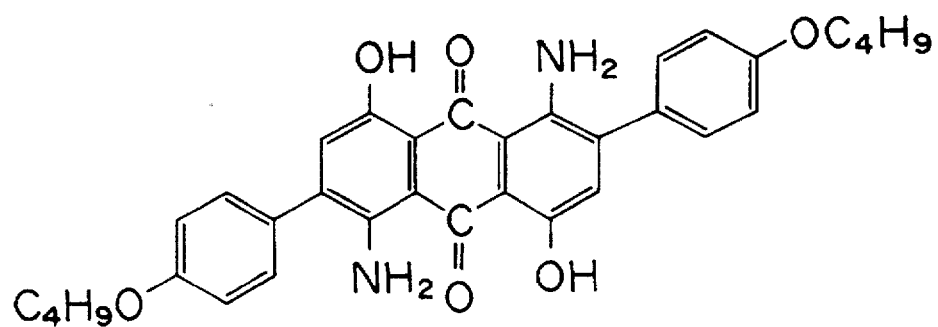

F I G. 60
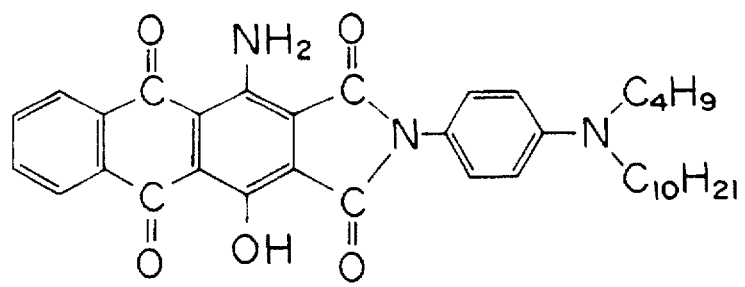
F I G. 61
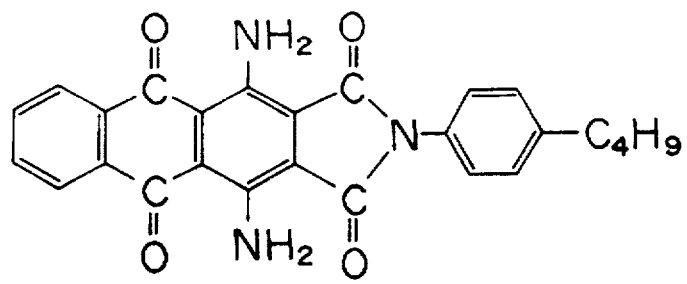
F I G. 62
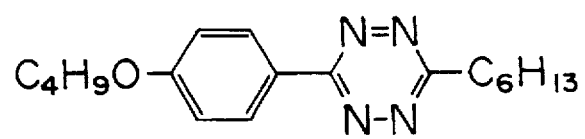
F I G. 63
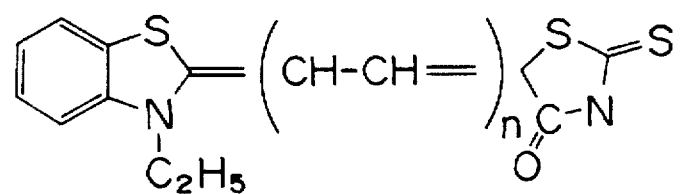

LIQUID CRYSTAL COMPOSITION

BACKGROUND OF THE INVENTION

1. Field of the Invention

This invention concerns liquid crystal compositions which exhibit useful changes in physical properties which are used for various devices by controlling external factors such as the electric field and the temperature. The liquid crystal compositions can be used at least, for example, in optical valves, light controlling glasses, recording media, optical shutters and electronic bulletin boards. In these devices, a function of memorizing a physical state without external energy is especially useful.

2. Description of the Related Art

In the past, elements known as so-called twisted nematic type liquid crystal elements and ferroelectric liquid crystal elements have been provided. However, these elements have required the use of polarizing plates for optical uses, and there are disadvantages that it has been difficult to obtain a bright display because of low light efficiency and a narrow viewing angle.

Thus, in order to resolve the disadvantages indicated above, light scattering type or so-called electric field effect type light controlling materials are studied. This concept is that in a light shielding state a large number of liquid crystal domains in which the liquid crystal molecules are orientated at random are formed to scatter the light, and in a light transmitting state liquid crystal orientation directions of each of the domains are aligned by applying an electric field. These materials are attempted for light controlling and display elements.

The polymer dispersed liquid crystals (PDLC) which have been disclosed as "liquid crystal light modulating materials" in Japanese Unexamined Patent Publication (KOHYO) No.63-501512 and as "liquid crystal structures and liquid crystal optical devices" in Japanese Unexamined Patent Publication (KOHYO) No.58-501631 are examples of light scattering type light controlling materials. In these polymer dispersed liquid crystals low molecular weight liquid crystals form a large number of small droplets or bubbles which are dispersed in a transparent polymeric material substrate. These droplets are hereinafter called domains (the domains comprised of the low molecular weight liquid crystals are dispersed in a polymer matrix).

On the other hand, low molecular weight liquid crystal-high molecular weight liquid crystal composites have been suggested as light scattering type light controlling materials which have a property to memorize a state. One off them is disclosed in Chemistry Letters, p.817–820, 1989, by T. Kajiyama et al. In the case of such a composite, the material becomes transparent when a high frequency alternating current electric field is applied, whilst they revert to opaque when a low frequency alternating current electric field is applied. This material has a memory property to memorize the respective states in a stable manner after the electric fields have been removed.

Moreover, the invention entitled "Liquid Crystal Compositions" of Japanese Unexamined Patent Publication (KOKAI) No.7-278549 by the present applicant concerns compositions comprising liquid crystal which have a positive dielectric anisotropy and flat shaped particles which have an affinity with the liquid crystal and were dispersed at a prescribed density in the liquid crystal.

However, the aforementioned conventional PDLC are transparent when the electric field is ON and opaque when the electric field is OFF, and a prescribed electric field must be applied continuously in order to maintain transparency. That is to say, they have no memory property. This is because the liquid crystal molecules inevitably revert to the initial state of random orientation as a result of interactions with the polymer matrix if the electric field is not applied continuously because the viscosity of the liquid crystal molecules is low. This characteristic is inappropriate for recording displays of fixed information such as recording media and electronic bulletin boards over prolonged periods of time.

Furthermore, the aforementioned conventional low molecular weight liquid crystal-high molecular weight liquid crystal composites can memorize its present state even when the electric field is removed, but the viscosity of the system is high because of the use of the high molecular weight liquid crystal and there is a disadvantage in that the response time is very long when compared with that of an ordinary liquid crystal system.

Because a memory and a high speed response characteristics are incompatible with each other in light controlling materials of a conventional light scattering type by using the electric field effect, any liquid crystal compositions appropriate for such light controlling materials have not been developed yet.

However, both memory and high speed response characteristics, the characteristics have been partly achieved in the aforementioned Japanese Unexamined Patent Publication (KOKAI) No.7-278549. However, in this reference, the memory state is erased by raising the temperature of the liquid crystal composition or applying a shear stress to the liquid crystal composition. Thus erasion of the memory state requires a means of temperature control or a means of imparting a shear stress. But, a problem is that such memory clear means prevent a device from being compact and convenient.

SUMMARY OF THE INVENTION

It is an object of the present invention to provide liquid crystal compositions which are light scattering type light controlling materials of the electric field effect type which have both memory and high speed response characteristics, and with which there is no need to provide a means of temperature control or a means of applying a shear stress.

A further object of the present invention is to increase markedly the difference between the amounts of light transmittance in the light transmitting state and the light scattering state, that is, to increase the light controlling contrast of the light controlling material.

In order to realize the above-mentioned objects, the inventors have concluded that the flat particle material should have an aspect ratio above a certain value. On the application of an electric field, the particle can change its own orientation, or its surface condition voluntarily or along with the change of a liquid crystal. The aspect ratio above a certain value gives the material a memory property to maintain its present orientation or state after the electric field is cut off. This aspect ratio effectively provides the material with a light scattering state by the formation of liquid crystal domains and memory characteristics in the orientation of the liquid crystal molecules.

Thus, it was concluded that in order to maintain the response rate at the same level as that of the liquid crystal alone, the flat particle material must interact with the liquid crystal molecules only through the boundary surface and must have virtually no effect on the internal viscosity of the liquid crystal. It was concluded that the laminated clay minerals typified by montmorillonite provide a typical example of a flat particle material which conforms with the abovementioned conditions, and that the layered inorganic-organic polymers which have organic groups covalently bonded onto a layered inorganic polymer provide another example.

On the other hand, in order to control the light scattering state and the light transmitting state reversibly by just controlling the electric field it is necessary that the change in orientation of the liquid crystals can be controlled actively against the restraining force of the abovementioned flat particle material. It was concluded that so-called two-frequency addressing liquid crystals could be used for this purpose. A two frequency addressing liquid crystal is a liquid crystal which exhibits positive dielectric anisotropy in an electric field in a certain frequency region (for example, the low frequency region) and which exhibits negative dielectric anisotropy in another frequency region (for example, the high frequency region).

Moreover, the inventors of the present application have discovered a noble light scattering phenomenon that when ionic components contaminated in a two frequency addressing liquid crystal (even in trace amounts) turbulence takes place in the liquid crystal under the electric field having a frequency region close to the boundary at which the dielectric anisotropy of the liquid crystal changes between positive and negative, and this scatters light effectively (DS: Dynamic Scattering).

This DS phenomenon is illustrated diagrammatically in FIG. 1. In FIG. 1, positivity (+) and negativity (−) of dielectric anisotropy are indicated on the ordinate as $\Delta\epsilon$, and the frequency of the electric field which is being applied is shown on the abscissa from low frequency to high frequency. In FIG. 1, $\Delta\epsilon$ is (+) in the low frequency region 1 and (−) in the high frequency region 2, and the occurrence of DS is seen at the electric field frequency in the region 3, a boundary area at which $\Delta\epsilon$ changes from (+) to (−).

The First Aspect

The first aspect of the invention is a liquid crystal composition which comprises: a liquid crystal primarily comprised of liquid crystal molecules which respond to an electric field and exhibit a positive dielectric anisotropy or a negative dielectric anisotropy depending on the frequency region of the electric field; and a plurality of flat shaped particles having an affinity with the liquid crystal and being dispersed in the liquid crystal at a density such that liquid crystal domains are formed effectively. The liquid crystal compositions of this first invention is driven, when changing from a transmitting state to a light scattering state, by an "electric field mode" in using the dielectric properties of the liquid crystal.

The liquid crystal composition of this first aspect is sealed in a cell panel constructed by opposing with a fixed spacing two transparent glass plates. Each plate has a transparent electrode on a face opposing to the other plate. Then an electric field of which the frequency is being controlled in accordance with a prescribed program is applied to the cell. The changes in the light transmittance are shown in FIG. 2. The function of the first aspect or the electric field mode is described below with reference to FIG. 2, wherein the Figure just shows the pattern of the changes in the light transmittance, but not quantitative changes of transmitted light. Furthermore, the facts shown in FIG. 2 have been confirmed experimentally, whilst FIG. 3 incorporates any presumption.

Moreover, since present flat shaped particles have good affinity with the present liquid crystal, the particles are generally well dispersed in the liquid crystal. Furthermore, the flat shaped particles are included at a density such that their light scattering function does not materially affect the optical transmittance of the liquid crystal composition.

Initially, when the liquid crystal composition is standing in a state where no voltage is being applied below the liquid crystalline temperature (the temperature at which the so-called liquid crystalline state is retained), the flat shaped particles 4 are dispersed with random orientation as shown in FIG. 3A and, as a result, a plurality of the loose cell structures 5 of which the boundaries are delineated by a number of the flat shaped particles 4 is formed in the liquid crystal composition 6. Now, within the individual cell structures 5 the liquid crystal molecules 7 form domains which have a different orientation from those in the adjacent cell structures 5 as a result of the boundary effect of the flat shaped particles 4. Hence, the orientation of the liquid crystal molecules 7 in the liquid crystal composition in general is random, and the liquid crystal composition 6 assumes the state where little light is transmitted (the light scattering state), shown as the state a in FIG. 2.

Next, when an electric field of a low frequency region 1 in FIG. 1 is applied to the plates from which the cell is constructed, the liquid crystal molecules 7 exhibit positive dielectric anisotropy. That is to say, the liquid crystal molecules 7 are orientated along the direction in which the electric field is being applied (in the direction perpendicular to the plane of the plates from which the cell is constructed). At this time, the flat shaped particles 4 are also orientated in the same direction, being driven by their own force in cases where they are themselves responsive to an electric field, or otherwise by the force imposed by the orientation of the liquid crystal molecules 7. As a result, the aforementioned cell structures 5 and domains are eliminated, as shown in FIG. 3B, and the liquid crystal composition 6 assumes a state where much light is transmitted (an optically transparent state), as shown by the state b in FIG. 2. The change from the state a to the state b in FIG. 2 can be said to be a high speed response since the response time is generally of the order of some 10 to 200 milliseconds.

Now, even if the applied voltage is removed, the light transmittance by the liquid crystal composition 6 only exhibits a slight fall but the light transmitting state is fundamentally retained, as shown by the state c in FIG. 2. Thus, the liquid crystal composition 6 is provided with a memory for the light transmitting state. It has been concluded that this memory is based on the mechanism outlined below.

Thus, the flat shaped particles 4 have a large mass and so even when the applied voltage is removed they do not revert to a random orientation as a result of Brownian motion. Hence, the orientation of the flat shaped particles 4 is regularized and so the liquid crystal molecules 7 are also retained in more or less the same orientation showing only a little change in orientation. This state is shown in FIG. 3C. Hence, the liquid crystal composition 6 exhibits a memory with only a slight fall in the transmitted light.

In those cases where the flat shaped particles 4 have been subjected to an organization treatment for rendering compatibility with organic substances to provide affinity with the liquid crystal, such as in the case of an organized clay mineral in particular, it is thought that the organic molecules which are attached to the surface of the flat shaped particles are entwined with the liquid crystal molecules 7 and play a significant part in maintaining the orientation of the liquid crystal molecules 7. The organized clay mineral has the surface covered with an organic substance by exchanging the inorganic ions present between the layers of the clay minerals with organic ammonium ions, or the like. Hence, the extent of the fall in transmitted light on changing from the state b to the state c in FIG. 2 in such a case is very small. This same trend is also recognized in the case where the flat shaped particles 4 were layered inorganic-organic polymers which have excellent affinity with liquid crystals.

Next, it is confirmed that when an electric field of a high frequency region 2 as shown in FIG. 1 is applied to the liquid crystal composition 6 which is in the state c where the memory is retained, the liquid crystal composition 6 will assume the state where little light is transmitted (the light scattering state) which is shown as the state d in FIG. 2.

The reason for the changes in transmitted light due to switching the electric field in this way in the electric field mode has not at this time been given a clear and rational explanation. Thus, it is not yet clarified how the flat shaped particles 4 and the liquid crystal molecules 7 orientate in this case. It can be, however, presumed that the liquid crystal molecules 7 exhibit negative dielectric anisotropy and that domain formation by the liquid crystal molecules 7 in some way occurs as can be seen from the transmission direction of the light (the direction perpendicular to the direction of orientation of the liquid crystal molecules).

Thus, even if the voltage which is being applied is removed in this state, the light transmittance by the liquid crystal composition 6 exhibits only a slight rise but, fundamentally, maintains the light scattering state, as shown by the state e in FIG. 2. Thus, the liquid crystal composition 6 is provided with a memory for the light scattering state as well. It has been concluded that the flat shaped particles 4 also play a dominant role in the mechanism of this memory.

Summarizing the points outlined above, a liquid crystal composition of this first aspect provides a light scattering type light controlling material of the electric field effect type which has both memory and high speed response characteristics and which does not require a means of temperature control nor a means of applying a shear stress.

The Second Aspect

The second aspect of the invention is a liquid crystal composition which comprises: a liquid crystal primarily comprised of liquid crystal molecules which respond to an electric field and exhibit a positive dielectric anisotropy or a negative dielectric anisotropy depending on the frequency region of the electric field; a plurality of flat shaped particles having an affinity with the liquid crystal and being dispersed in the liquid crystal at a density such that liquid crystal domains are formed effectively; and an ionic component. The liquid crystal compositions of this second invention which contain an ionic component are driven when changing from a transmitting state to a light scattering state by a "DS mode", using the DS phenomenon originating from the ionic component in the liquid crystal.

The changes in the light transmittance by a liquid crystal composition of this second aspect when a liquid crystal composition of this second aspect is sealed into a cell panel constructed in the same way as in the first aspect and applying an electric field of which the frequency is controlled in accordance with a prescribed program to the cell will be described as the function of this second aspect, which is to say the DS mode. The circumstances of the changes in light transmittance in this case are quantitatively changes of the same order as in the aforementioned case shown in FIG. 2 and so, for convenience, they will be described with reference to FIG. 2.

Moreover, the preferred state of dispersion of the flat shaped particles in the liquid crystal and the preferred dispersion density thereof are the same as in the case of the aforementioned first invention.

Initially, when the liquid crystal composition is left to stand in a state with no voltage applied below the liquid crystalline temperature, the same state as shown in the aforementioned FIG. 3A is assumed, and the liquid crystal composition assumes the light scattering state shown by the state a in FIG. 2.

Next, when an electric field of a low frequency region 1 is applied to the plates from which the cell has been constructed, the state is as shown in the aforementioned FIG. 3B, and the liquid crystal composition assumes the light transmitting state shown as state b in FIG. 2. The change from the state a to the state b in this way can be said to have a high speed response, with a response time generally of from 10 to 200 milliseconds.

If the applied voltage is removed there is only a slight fall in the light transmittance by the liquid crystal composition, as shown by the state c in FIG. 2, but the light transmitting state is fundamentally maintained. Thus, the liquid crystal composition is provided with a memory for the light transmitting state. It can be presumed that the mechanism of this memory is the same as the aforementioned mechanism of the memory for the light transmitting state of the first aspect.

Next, when an electric field in the DS region 3 in the aforementioned FIG. 1 is applied to the liquid crystal composition which is in the state c where the memory is retained, the aforementioned DS phenomenon occurs in the liquid crystal due to the ionic component, the orientation of the flat shaped particle and the liquid crystal molecules is disturbed, and the liquid crystal composition assumes the domain forming state of FIG. 3D. As a result, the liquid crystal composition assumes the light scattering state shown as the state d in FIG. 2.

Now, even if the applied voltage is removed in this state there is only a slight increase in the light transmitted by the liquid crystal composition 6, as shown by the state e in FIG. 2 and, fundamentally, a light scattering state is maintained. Thus the liquid crystal composition 6 is also provided with a memory for the light scattering state. It can be presumed that the mechanism of this memory is also the same as the aforementioned mechanism of the memory in the case where the high frequency region 2 applied voltage was removed.

Moreover, as will be described hereinafter, since the concentration of the ionic component which is required for the DS mode is fairly low, liquid crystal compositions for the electric field mode can be unintentionally appropriate for liquid crystal compositions of the DS mode. In such cases, the transmitted light can be well controlled by the electric field operation of either the abovementioned electric field mode or the DS mode.

Summarizing the points outlined above, the liquid crystal compositions of this second aspect also provide, as in the first aspect, light scattering type light controlling materials of the electric field effect type which have both memory and high speed response characteristics and do not require a means of temperature control or a means of applying a shear stress.

The Third Aspect

The third aspect of the invention is a liquid crystal composition in which a dichroic dye is further included as a composition component in the aforementioned first aspect or second aspect.

The third aspect is constituted by further adding as a composition component a dichroic dye to a liquid crystal composition of the first aspect or of the second aspect. Hence, by selecting and using various dyes which have different absorption spectra it is possible to achieve multicoloration which imparts optional hues to the transmitted light of the liquid crystal composition.

On the other hand, the dichroic dye is orientated at random and has a light absorbing effect in the light scattering state of the liquid crystal composition and in the memory state, and the dichroic dye is also orientated in the light transmitting state of the liquid crystal composition and the memory state and so it has virtually no light absorbing effect. That is to say, the light absorbing effect of the dichroic dye appears and disappears in synchronization with the light scattering state and the light transmitting state of the liquid crystal composition, and so the light controlling contrast is further increased. The other points are fundamentally the same as the function of the first aspect or the second aspect.

Summarizing the points outlined above, a liquid crystal composition of the third aspect can provide any color of transmitted light by the liquid crystal and can have increased light controlling contrast between the light transmitting state and the light scattering state of the liquid crystal composition in addition to the effects of the first aspect or the second aspect.

The Fourth Aspect

The fourth aspect of the invention is a liquid crystal composition wherein the liquid crystal molecules in the aforementioned first, second or third aspect comprise molecules of low molecular weight.

In the fourth aspect, the liquid crystal molecules of the liquid crystal composition are molecules of low molecular weight. Hence, the change in orientation of the liquid crystal molecules to the light transmitting state or the light scattering state occurs more quickly, and the high speed response of the liquid crystal composition is increased further. In other respects the fourth aspect is fundamentally the same as the first, second or third aspect.

Summarizing the points outlined above, a liquid crystal composition of the fourth aspect has a further improved high speed response in addition to the effects of the first, second or third aspect.

The Fifth Aspect

The fifth aspect of the invention is a liquid crystal composition in which the flat shaped particles in the aforementioned first, second, third or fourth aspect are particles which exhibit responsiveness to an electric field.

In the fifth aspect, the flat shaped particles which are included in the liquid crystal composition are particles which are responsive to an electric field. Hence, on applying a voltage, not only the liquid crystal molecules but the flat shaped particles themselves are orientated and so there is no slight variability in the orientations of the liquid crystal molecules and the flat shaped particles in the light transmitting state, and there is even more transmitted light. As a result, the light controlling contrast of the light transmitting state and the light scattering state is increased even further. In other respects, the function of the fifth aspect is fundamentally the same as the function of the first, second, third and forth aspects.

Summarizing the points outlined above, a liquid crystal composition of the fifth aspect has, in addition to the effects of the first, second, third or fourth aspect, increased transmitted light in the light transmitting state, and therefore further increased light controlling contrast of the light transmitting state and the light scattering state.

The Sixth Aspect

The sixth aspect of the invention is a liquid crystal composition in which the flat shaped particles in the aforementioned first, second, third, fourth or fifth aspects comprise organized laminated clay mineral.

In the sixth aspect, the flat shaped particles consist of organized layered clay mineral. Organized layered clay minerals exhibit an affinity with the liquid crystal and are responsive to an electric field. Moreover, the layered clay minerals form particles of large aspect ratio, because they are readily divided into the crystal the crystal layer units as a result of being organized. From the facts described above, the organized layered clay minerals are excellent materials as a component of the cell structures for delineating the domains of the liquid crystals. Hence, in the sixth aspect, the various functions of the aforementioned flat shaped particles can be realized efficiently.

Furthermore, as mentioned earlier, the layered clay minerals, as typified by montmorillonite, interact with liquid crystal molecules only through the boundary surface and have virtually no effect on the internal viscosity of the liquid crystal and so in those cases where the flat shaped particles comprise organized layered clay mineral, the response rate with respect to an electric field can be maintained at the same level as that of the liquid crystal alone.

Moreover, as mentioned earlier, it is thought that the organic molecules which are attached to the clay mineral surface are entwined with the liquid crystal molecules 7 and that they fulfill a special role in maintaining the orientation of the liquid crystal molecules 7 and so the memory for the light scattering state and the light transmitting state is even better.

Summarizing the points outlined above, a liquid crystal composition of this sixth aspect provides, in addition to the effects of the first, second, third, fourth and fifth aspects, the typical and efficient realization of the various functions of the flat shaped particles, enables the response rate to an electric field to be maintained at the same level as that of the liquid crystal alone and, moreover, provides in particular a better memory for the light scattering state and the light transmitting state.

The Seventh Aspect

The seventh aspect of the invention is a liquid crystal composition in which the flat shaped particles in the aforementioned first, second, third, fourth or fifth aspect are layered inorganic-organic polymer particles in which organic groups have been bonded covalently onto a layered inorganic polymer.

In the seventh aspect, the aforementioned flat shaped particles consist of a layered inorganic-organic polymer. Layered inorganic-organic polymers, for the reasons outlined hereinafter, can have an even greater affinity with liquid crystals than the organized layered clay minerals and they can easily be dispersed very finely in a liquid crystal because of the synthetic process. For these reasons, the layered inorganic-organic polymers are even better than the organized layered clay minerals as structural materials as a component of the cells structures for delineating the liquid crystal domains. Hence, in the seventh aspect, the various functions of the aforementioned flat shaped particles are realized typically and effectively.

Furthermore, for the same reasons as in the case of the aforementioned sixth aspect, it is thought that the organic groups which are covalently bonded onto the layered inorganic polymer are entwined with the liquid crystal molecules 7 and play a special role in maintaining the orientation of the liquid crystal molecules 7 so that the transmitted light and memory of the light transmitting state are even better.

Moreover, in the same way as with the aforementioned layered clay minerals, the layered inorganic-organic polymers interact with the liquid crystal molecules only through the boundary surface and have hardly any effect on the internal viscosity of the liquid crystal and so the response rate to an electric field can be maintained at the same level as that of the liquid crystal alone.

Summarizing the points outlined above, a liquid crystal composition of this seventh aspect provides, in addition to the effects of the first, second, third, fourth and fifth aspects, the typical and efficient realization of the various functions of the flat shaped particles in the same way as, or even better than, in the sixth aspect, enables the response rate to an electric field to be maintained at the same level as that of the liquid crystal alone and, moreover, provides in particular a better memory for the light scattering state and the light transmitting state.

BRIEF DESCRIPTION OF THE DRAWINGS

FIG. 6 shows a simplified liquid crystal cell which had been prepared.

FIG. 7 shows the simplified system for measuring transmitted light used in the examples.

FIGS. 9 to 32 show respectively the chemical structures of two frequency addressing liquid crystals which can be used in the invention.

FIGS. 33 to 63 show respectively the chemical structures of dichroic dyes which can be used in the invention.

DETAILED DESCRIPTION OF THE INVENTION

Figure 1:
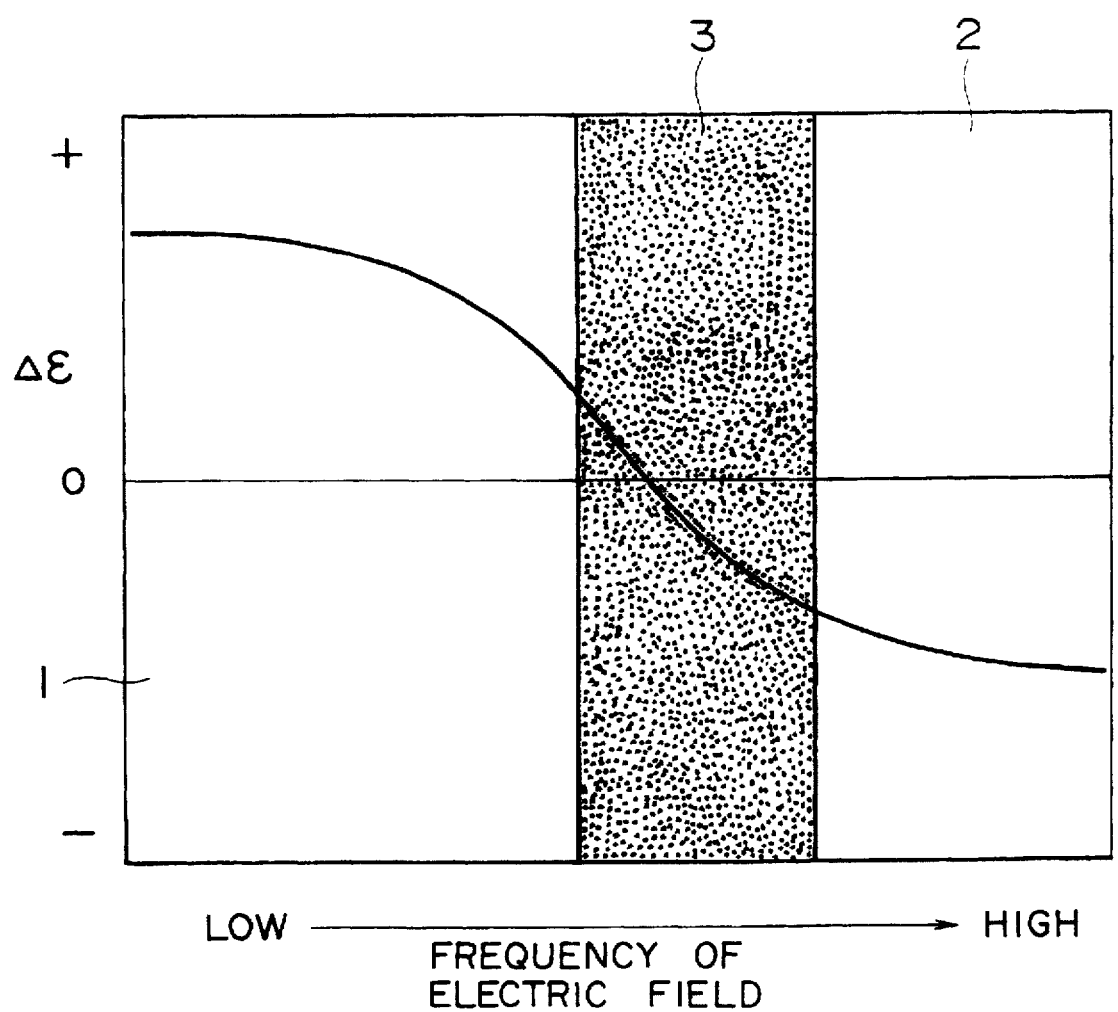
FIG. 1 shows the frequency dependence of the dielectric anisotropy of a two frequency addressing liquid crystal.

The first, second, third, fourth, fifth, sixth and seventh aspects of the invention are described in detail below.
The Liquid Crystal The liquid crystal compositions in each aspect of this application contain, as a composition component, a liquid crystal which h as liquid crystal molecules which are responsive to an electric field and exhibit selectively positive dielectric anisotropy or negative dielectric anisotropy depending on the frequency region of the electric field, which is to say a two frequency addressing liquid crystal. Those indicated in FIGS. 9 to 14, for example, are typical examples of such liquid crystal molecules.

The phase of the liquid crystal molecules is preferably nematic or cholesteric for reasons of a high responsiveness to the electric field, but a smectic phase can be used provided that it exhibits the prescribed responsiveness to an electric field. A single type of liquid crystals may be used alone, or mixtures of two or more types of liquid crystal may be used. In general, the use of a mixture of liquid crystals is preferred for obtaining a liquid crystal which satisfies the various requirements.

If, among the abovementioned liquid crystals, those of which the liquid crystal molecules have a low molecular weight are used then the speed of the response to an electric field is increased, and this is desirable since the threshold voltage for an electric field response can be set lower. Here, although the term "low molecular weight" differs depending on the chemical structure of the liquid crystal molecule, an exemplary molecular weight is not more than 1,000. Those shown in the aforementioned FIGS. 9 to 14, and FIGS. 15 to 32, can be cited as examples of liquid crystal molecules of this type. However, it is, of course, possible to use liquid crystal molecules which are not low molecular weight molecules.

The Flat Shaped Particles

The expression "flat" as used in the term "flat shaped particles" in each aspect of this application signifies that the aspect ratio of the particles is above a certain level and, in general, an aspect ratio of at least 2, and preferably of at least 5, is desirable for forming the cell structure domains effectively in the liquid crystal composition. The shape of the particles is not limited to a plate-like form, and it may be rod-like or needle-like.

No limitation is imposed upon the material from which the flat shaped particles a re constructed. However, in those cases where the flats shaped particles are particles which spontaneously change the orientation due to an electric field, the change in orientation occurs distinctly and rapidly, and so this is desirable in that the aforementioned functions and effects occur more distinctly.

Preferred examples of flat shaped particles include layered clay minerals, layered inorganic-organic polymers, titanium oxide, alumina white (water insoluble basic aluminum sulfate), calcium carbonate, zinc oxide flakes, scale-like aluminum powder, prussian blue, hematite oxide, plate-like crystals of various ceramics, and graphite. Moreover, organic material crystals and metals complexes of organic materials, for example, can also be used. Moreover, particles with which there is no spontaneous change in orientation due to an electric field can also be used in the invention of this application. The particles constructed from organic polymers such as polyethylene, polypropylene and polytetrafluoroethylene can be cited as examples of particles which exhibit little or virtually no response to an electric field.

On the other hand, flat shaped particles which interact with the liquid crystal molecules only through the boundary surface and which have hardly any effect on the internal viscosity of the liquid crystal are preferred for keeping the response rate of the liquid crystal composition at the same level as that of the liquid crystal itself.

When the abovementioned requirements are taken into consideration, the layered clay minerals or the layered inorganic-organic polymers are the most desirable materials for the flat shaped particles. Natural or synthetic montmorillonite, saponite, mica or hectorite, for example, can be used as a layered clay mineral, but montmorillonite in particular is typical since it can be dispersed comparatively easily in a liquid crystal.

The layered inorganic-organic polymers are polymers in which organic groups are covalently bonded to a layered inorganic polymer. Among the layered inorganic-organic polymers there are those which have a so-called 2:1 type structure in which a tetrahedral layer is formed on both sides of an octahedral layer, and those which have a so-called 1:1 type structure in which a tetrahedral layer is formed on one side of an octahedral layer. The 2:1 type structure in which organic groups are covalently bonded on both surfaces of the layered structure are relatively more desirable in consideration of their compatibility with the liquid crystal.

Figure 4:
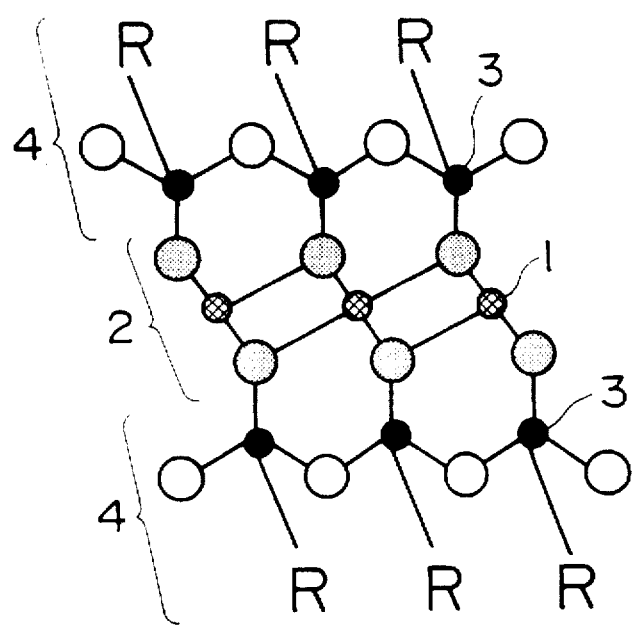
FIG. 4 shows part of the structure of a layered inorganic-organic polymer.

The partial structure of a layered inorganic-organic polymer of the 2:1 type structure is shown in FIG. 4. Taking the metal atom 1 which may be of one type, or of two or more types, selected from among Mg, Al, Ni, Co, Cu, Mn, Fe, Li, V and Zr as the central atom, an octahedral structure with oxygen atoms at each of the corners of the surrounding octahedron is formed, and the octahedral layer 2 is constructed by arranging the octahedral structures continuously in two dimensions with the oxygen atoms at the boundaries being shared between adjoining octahedra.

The tetrahedral layers 4 are constructed on both sides of the octahedral layer 2 by taking the silicon atom 3 (this may be replaced in part or entirely with the atoms Al, Fe, Ge or P) as the center atom and forming tetrahedral structures which have oxygen atoms at each corner of the surrounding tetrahedron and arranging these tetrahedral structures continuously in two dimensions, sharing the oxygen atoms at the boundaries between the adjacent tetrahedra. The oxygen atoms at the corners which are in contact with the octahedral layer in the tetrahedral structures are shared with the octahedral structures of the octahedral layer.

The silicon (or atom which replaces the silicon) which is the central atoms of the tetrahedral layer is bonded covalently with the organic group R which replaces an oxygen atom at from one to three of the three corners other than the corner which is in contact with the aforementioned octahedral layer in the tetrahedral structure. The organic group R protrudes outward from the tetrahedral layer. However, by means of the manufacturing procedure described hereinafter, it is possible to establish central atoms to which no organic group R is covalently bonded (central atoms with which oxygen atoms are located at each corner of tetrahedron). Hence, the bonding proportion of organic groups R on the central atoms can be devised freely, and the extent of the organization of the layered inorganic-organic polymer can be controlled freely. Thus, the whole surface of the layered inorganic-organic polymer can be organized without gaps, or to the required extent, and it is easy to provide a high degree, or the required degree, of affinity with the liquid crystal.

No limitation is imposed on the type of the organic group R mentioned above. The aliphatic and aromatic hydrocarbyl groups having from 1 to 50 carbon atoms are examples of such a group. In consideration of the affinity with the liquid crystals, the so-called liquid crystal groups, such as the aromatic ester group and the cyanobiphenyl group, can be used as other examples. Provided that it does not react with the liquid crystal molecules and destroy the properties of the liquid crystal, any functional group may be provided for the organic group R.

The layered inorganic-organic polymers are prepared directly, or with aging, by dissolving or dispersing the components a) and b), and, if required c), indicated below in the liquid d), adding an alkali and adjusting to a weakly alkaline pH. Moreover, some or all of the component a) can be replaced with an organometallic alkoxide which contains Al, Fe, Ge or P, and some or all of the component c) may be replaced with metal alkoxide which contains Al, Fe, Ge or P, and in such cases some or all of the Si which is the central atom of the tetrahedral structures is replaced with Al, Fe, Ge or P atom.

a) An organoalkoxysilane which has at least one alkoxide group and at least one organic group.

b) An inorganic salt, organic salt or alkoxide of at least one type of metal from among Mg, Al, Ni, Co, Cu, Mn, Fe, Li, V and Zr.

c) A silicon alkoxide which has at least one alkoxy group.

d) One type of inorganic or organic polar solvent, or a solvent mixture of two or more types of polar solvent.

The organoalkoxysilane a) supplies the organic groups and the central atoms for the tetrahedral layer in the layered inorganic-organic polymer, and it is an organoalkoxysilane which has at least one alkoxy group (which is needed to bond the silicon atom which is the central atom in the tetrahedral layer with the octahedral layer) and at least one organic group. Hence, those which have a ratio of from alkoxy groups 3: organic group 1 to alkoxy group 1: organic groups 3 can be used.

The metal inorganic salt, organic salt or alkoxide b) supplies the central atoms of the octahedral layer in the layered inorganic-organic polymer, and the type of metal is at least one type, or two or more, selected from among Mg, Al, Ni, Co, Cu, Mn, Fe, Li, V and Zr. No limitation is imposed upon the type of inorganic acid or organic acid which forms the salt with these metals. Some of the metal is replaced with silicon which is the central atom in the tetrahedral layer in the course of the execution of the invention.

The silicon alkoxide c) is used conjointly with the organoalkoxysilane a), as required, to adjust the organic group content of the layered inorganic-organic polymer, and it has at least one alkoxy group and no organic group. Hence, those which have from one alkoxy group to four alkoxy groups can be used.

It is possible to produce layered inorganic-organic polymers of the aforementioned 2:1 type and 1:1 type selectively by selecting the ratio of the amounts of a), or a) and c), and b) which are used. In short, it depends on the equivalent ratio of the metal atom which becomes the central atom on the octahedral layer and the silicon atom which becomes the central atom in the tetrahedral layer.

For example, with a metal atom : silicon atom ratio of from about 1:0.5 to about 1:1 a layered inorganic-organic polymer of the 1:1 type is formed preferentially, and with a metal atom : silicon atom ratio of from about 1:2 to about 3:4 a layered inorganic-organic polymer of the 2:1 type is formed preferentially.

The solvent d) is water as an inorganic polar solvent, or inorganic acid, organic acid, acetone or alcohol as an inorganic polar solvent, one of these solvents being used individually, or a solvent mixture comprising two or more such solvents is used.

It is not always necessary to dissolve a) and b), and c) as required, completely in the solvent d), and a state of dispersion to a certain degree may be satisfactory. The alkali which is added to the solution or dispersion may be of any type.

The weakly alkaline pH to which the mixture is adjusted with the addition of alkali depends on factors such as the raw material system which has been selected, for example, and cannot be specified precisely, but it is, for example, of the order of pH 8–10. In short, it is the pH at which recrystallization, which is to say gelation, as the layered inorganic-organic polymer, occurs at least the desired rate, so far as not being so strongly alkaline that the organic groups are lost. The abovementioned gelling process proceeds satisfactorily at temperature around room temperature, but gelation can be carried out under high temperature conditions so far as not being so high that the organic groups are not lost. The extent of the crystallization of the layered inorganic-organic polymer can be reduced intentionally (it becomes amorphous at a certain limit) and its light scattering capacity as particles can be suppressed. This can be achieved by shifting the pH during the synthesis slightly to the alkali side, by controlling the temperature and time of the gelling process, by controlling the raw material concentration in the solvent and by selecting the central atom of the octahedra.

There are cases where the gelling process is completed immediately and cases where some degree of aging (for example of the order of from 1 to 2 days) is required, depending on the raw material system which has been selected and the reaction conditions. The crystalline layered inorganic-organic polymer obtained may be recovered as a dry powder by removing the solvent, or it may be used for compositing with the liquid crystals as it is without removing the solvent.

Simple mixing of the two components is satisfactory for compositing the layered inorganic-organic polymer with the liquid crystal. At this time the layered inorganic-organic polymer is preferably swelled with solvent to facilitate dispersion. If the liquid crystal and the layered inorganic-organic polymer are mixed using a common solvent they can be mixed more uniformly. The use of a volatile solvent for these solvents is preferred since it can then be removed by evaporation after mixing.

The particle size of the flat shaped particles is suitably of the order of from 0.1 to 20 µm. If the particle size is below this range then it is impossible to form the domains in the liquid crystal composition effectively and this is inappropriate. If the particle size is above this range then problems arise with the appearance of the light controlling material and with non-uniformity of the liquid crystal composition when a device is constructed using this material, and there is a risk that physical orientation will be inadequate in cases where cells which have a cell gap of a few tens of micrometer are constructed for a device. The most desirable particle size ranges from 0.2 to 5 µm. Layered clay minerals or layered inorganic-organic polymers are easily prepared in these appropriate particle size ranges.

The flat shaped particles are preferably dispersed at a certain density at which liquid crystal domains are formed effectively. On the other hand, if the density of the flat shaped particles is too high then there is a stage at which any change in orientation is limited, and this is undesirable. The density which fulfills these requirements simultaneously differs depending on the type of liquid crystal and the type and size of the flat shaped particles for example, and it is difficult to specify precisely but, in general, the dispersion of from 0.6 to 10 parts by weight of flat shaped particles (in the case of organized particles this relates to the particles excluding the organizing agent) per 100 parts by weight of liquid crystal is desirable. This range is also appropriate in those cases where the flat shaped particles are of a layered clay material or a layered inorganic-organic polymer.

The state in which the individual particles are completely dispersed is not essential as the state of dispersion of the flat shaped particles in the liquid crystal, and even if some of the particles are aggregated in units ranging from a few particles to a few tens of particles this is generally satisfactory provided that the aforementioned function and effect of the flat shaped particles can be realized. For example, with layered clay minerals, some of the particles in the dispersed state in the liquid crystal are sometimes present in a form where a few tens of particles are laminated together (unit layers) and the aforementioned function and effect of the flat shaped particles can be realized with such units.

The flat shaped particles must have an affinity for the liquid crystal if such a dispersed state is to be maintained. In those cases where the flat shaped particles are comprised of a material which itself has an affinity for the liquid crystal, such as some organic material crystals and the metal complexes of organic materials for example, they can be used as they are. However, in those cases where the flat shaped particles consist of a material which does not have an affinity for the liquid crystal, such as particles comprising inorganic materials, like the layered clay minerals for example, a treatment for providing affinity with the liquid crystal is essential. Treatments whereby an organic material is adsorbed on, or bonded to, the surface of the particles are general examples of such a treatment.

In those cases where the flat shaped particles are a layered clay mineral in particular, the execution of ion exchange is effective for achieving affinity with the liquid crystal. That is to say, alkali metal ions are present between the layers of the layered clay minerals and so it is possible to provide an affinity with liquid crystals by exchanging these with organic onium ions which have an affinity with the liquid crystal molecules or the onium ions which are liquid crystal groups (so-called organization).

The type of the abovementioned onium ions is selected optimally depending on the type of liquid crystal molecules which are being used so that there is excellent affinity with the liquid crystal molecules, but the alkylammonium ion is a typical example. Moreover, it is possible with the selection of the organic onium ion to control various features, such as the surface properties of the layered clay mineral, the electrical and optical properties, the dispersion properties and the responsiveness to an electric field, and this is advantageous.

Any method can be used to prepare the composition of liquid crystal and flat shaped particles which have an affinity with the liquid crystal provided that the two can be mixed easily. However, more uniform mixing is achieved if the two materials are mixed together uniformly using a common solvent and the common solvent is then removed by an appropriate means. The same can be said of the preparation of compositions of liquid crystals and layered clay minerals.

The Dichroic Dyes

Provided that the spectral change is suitable for the application, any dichroic dye can be used in each aspect of the application, and no particular limitation is imposed upon the molecular form or the crystalline form but, for the same reasons as in the case of the aforementioned flat shaped particles, those which have an aspect ratio greater than a certain value, being rod-like, for example, are preferred.

Examples of dichroic dyes include the azo based dichroic dyes shown in FIGS. 33–52, the azomethine based dichroic dyes shown in FIGS. 53–56, the styryl based dichroic dye shown in FIG. 57, the anthraquinone based dichroic dyes shown in FIGS. 58–61, the tetrazine based dichroic dye shown in FIG. 62 and the merocyanine based dichroic dye shown in FIG. 63.

In connection with the state in which the dichroic dyes are included in the liquid crystal, those which are compatible with the liquid crystal are typically dissolved in the liquid crystal.

Irrespective of whether or not the dichroic dye is compatible with the liquid crystal, it is may be adsorbed on the flat shaped particles and, in those cases where the flat shaped particles are of a layered clay mineral, a dichroic dye which has an onium group may be intercalated between the layers of the layered clay mineral by ion exchange, and an effective state is obtained in these cases. In these cases, the orientation of the dichroic dye is controlled by the orientation of the flat shaped particles or the orientation of the layered clay mineral and so it must be adsorbed or intercalated parallel with, or more or less parallel with, the long axis direction of the flat shaped particle or layered clay mineral.

The three abovementioned states of including a dichroic dye in a liquid crystal may each be executed selectively in any one case, or two or more of these states can be involved at the same time.

The Ionic Component

It is thought that an ionic component is an essential requirement in the DS mode. Moreover, there are also cases where the drive voltage for the DS mode can be reduced, depending on the concentration of the ionic component, and this is desirable. The appropriate ionic component concentration varies depending on the type of liquid crystal and flat shaped particles and so it cannot be fixed precisely. However, in general, a concentration of from about 0.00001% by weight to about 0.1% by weight with respect to the liquid crystal is preferred.

The concentration of the ionic component required is low, as indicated above, and the ionic component which is included as impurity in the cell of the device, the liquid crystal or the flat shaped particles on its own may be sufficient. Of course, ionic component can be added intentionally.

If the concentration of ionic component is too high then crystals of the ionic component may be precipitated out or the electric current may become excessive and heating may occur and the durability of the device will be reduced. Conversely, if the concentration of the ionic component is too low then the DS phenomenon may not appear at the required level and it will not be possible to realize satisfactorily the drive voltage reducing effect in the DS mode.

As a general rule, no limitation is imposed upon the type of ionic component. Organic salts, metal salts and halogen, for example, can be used as typical ionic components. Ammonium salts can be considered, for example, as organic salts. The quaternary ammonium salts represented by $(R_4)$ N—X in particular are typical. The aforementioned R group represents a linear chain, branched, saturated or unsaturated hydrocarbyl group which has from 1 to 30 carbon atoms, and the four R groups may be the same or different groups. X represents a halogen atom such as iodine, bromine, chlorine or fluorine, or some other negative ion. In those cases where X is a halogen, this forms a complex with the liquid crystal molecules and becomes the ionic component in the liquid crystal composition.

Other Composition Components

In addition to the liquid crystals, flat shaped particles, ionic components and dichroic dyes described above, optional composition components which are included in known liquid crystals or liquid crystal compositions can be included in accordance with the known methods in the liquid compositions of the invention of this application. Examples of such composition components include liquid crystal improving agents such as stabilizers, viscosity adjusting agents such as thickeners and viscosity reducing agents, and organic onium salts.

Driving the Liquid Crystal Compositions

The application of an electric field of the prescribed voltage in the frequency region such that the extent of the dielectric anisotropy of the liquid crystal becomes about 0.5 is desirable for setting the liquid crystal composition in the light transmitting state by applying the low frequency region 1 voltage in FIG. 1. If the extent of the dielectric anisotropy is less than 0.5 than the response rate may be reduced somewhat and there is a risk that a satisfactory transparent state (light transmitting state) will not be realized. As an example, the appropriate electric field frequency when a LIXON DF-02XX liquid crystal manufactured by Chisso Chemicals was being used was from 30 to 500 Hz.

Figure 5:
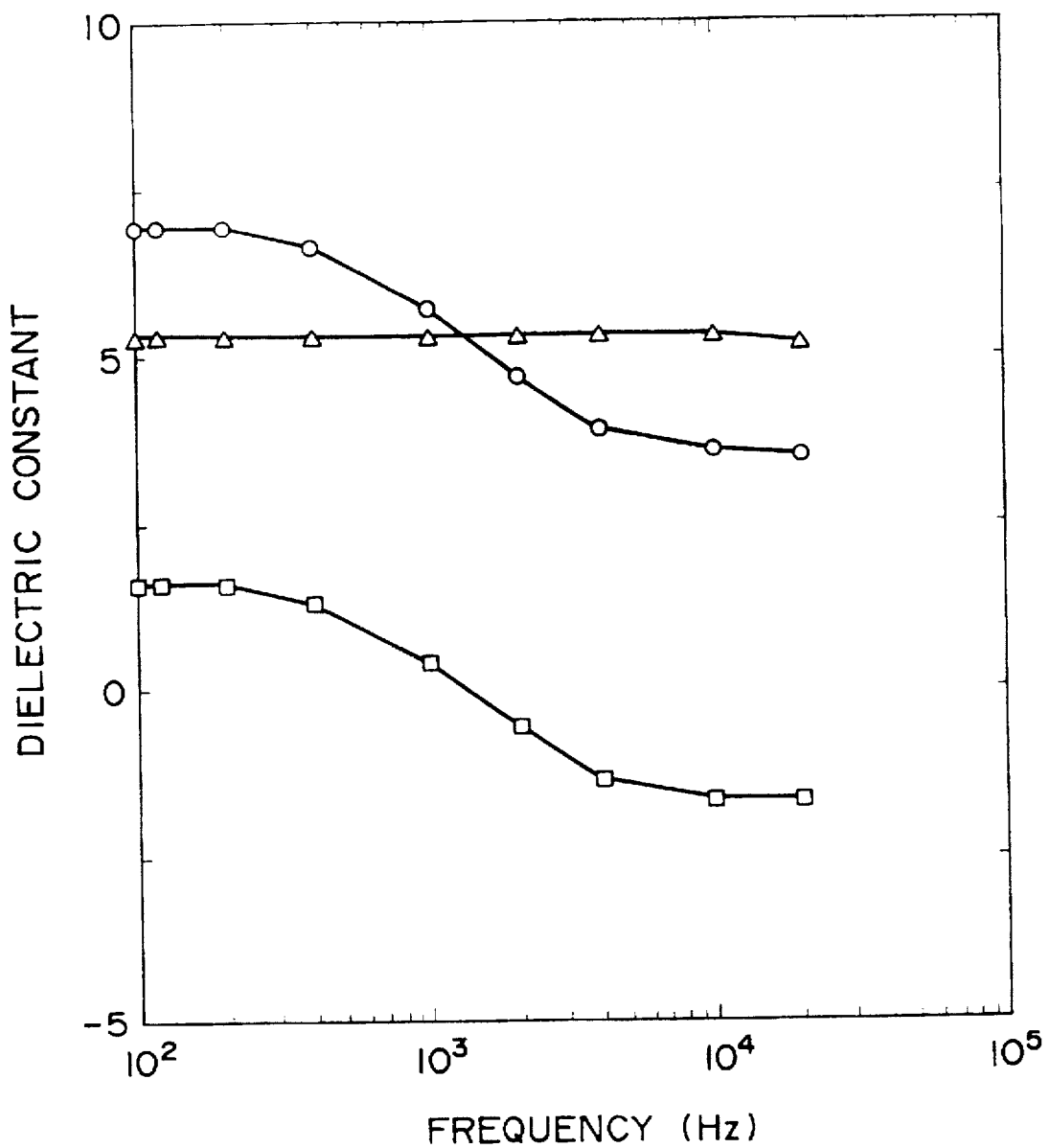
FIG. 5 shows the frequency dependence of dielectric parameters of a liquid crystal.

The frequency dependence of $\Delta\epsilon$ of the abovementioned LIXSON DF-02XX is shown in FIG. 5. The dielectric anisotropy is shown as a numerical value on the ordinate in FIG. 5, and the frequency (Hz) of the applied electric field is shown on the abscissa. In FIG. 5, the curve plotted with white circles shows the dielectric constant in the molecular axis direction, the curve plotted with the white squares shows the dielectric constant in the direction perpendicular to the molecular axis, and the curve plotted with white triangles shows the dielectric anisotropy.

Next, the control of the electric field for setting the liquid crystal composition in the light scattering state by applying a voltage in the high frequency region 2 or 3 in FIG. 1 may be carried out in either the electric field mode or the DS mode, the inclusion of an ionic component in the liquid crystal composition being taken generally as a prerequisite. In general, the three-dimensional random orientation structure of the liquid crystal molecules in the light scattering state is more pronounced in the DS mode and so the scattering intensity of the light tends to be greater than that in the electric field mode where a two-dimensional random orientation structure is adopted, and this is better for use as a light scattering type element. On the other hand, in those cases where the liquid crystal composition contains a dichroic dye, in the electric field mode the dichroic dye is also orientated perpendicular to the direction in which the electric field is being applied in the light scattering state where a voltage in the high frequency region 2 is being applied, and there is a memory for this state, and so the light absorbing effect of the dichroic dye is produced at a maximum level. Hence, this is ideal when a liquid crystal composition to which a dichroic dye has been added is used as a light scattering-light absorbing type element.

For selecting the DS mode, an electric field of the prescribed voltage of a frequency in the region where the absolute value of the positive or negative dielectric anisotropy is comparatively small in the DS region is preferred. In practical terms, a range for the value of the dielectric anisotropy from +0.5 to −1.0 is preferred for realizing a stable DS phenomenon, but there are cases where a stable DS phenomenon is realized outside this region. The frequencies corresponding to these regions differ depending on the type of liquid crystal, but in those cases where the aforementioned LIXON DF-02XX is used, a frequency of some 600 to 3,000 Hz is suitable at room temperature.

For selecting the electric field mode, the application of an electric field of the prescribed voltage in the frequency region such that the dielectric anisotropy of the liquid crystal has a comparatively large negative value, for example of −1.0 or below, is desirable. The actual frequencies which correspond to this differ depending on the type of liquid crystal, but in those cases where the aforementioned LIXON DF-02XX is used, a frequency of at least about 3,000 Hz is suitable at room temperature.

Applications of the Liquid Crystal Compositions

The liquid crystal compositions of the inventions of this application can be used quite freely for any purpose, in any application, and in the construction of any device.

However, a cell can be constructed by preparing a pair of substrates for which transparent electrodes of indium tin oxide (ITO) have been established on a transparent film made of glass or synthetic resin, opposing these substrates with a spacer and sealing the liquid crystal composition between the substrates as one example of the use of a liquid crystal composition of the invention of this application as a light scattering type light controlling material. Furthermore, a plurality of cells can be constructed simultaneously by sealing a liquid crystal composition into the vacuoles in a transparent polymer material which has a plurality of the aforementioned vacuoles internally and which has transparent electrodes established on both sides. These cells, or a matrix encompassing these cells, may be fitted with a temperature controlling device or a device which imparts a shear stress, such as a vibration or shock for example.

Illustrative Examples

Illustrative examples of the inventions of this application are described below.

EXAMPLE 1
Preparation of Organized Montmorillonite

Highly pure Na-montmorillonite (2.00 grams) obtained from Bentonite produced in the Yamagata Prefecture of Japan (ion exchange capacity 119 meq./100 g) was dispersed in 70 ml of water.

On the other hand, 0.955 grams of 4-(11-aminoundecyloxy)-4'-cyanobiphenyl was dissolved in 15 ml of ethanol, 0.281 grams of concentrated hydrochloric acid was added to the solution and the ammonium salt was prepared. The ammonium salt crystallized and a precipitate was produced, the water and ethanol were distilled off and it was dissolved again in a mixed ethanol-water (40 ml: 10 ml) solvent.

The aforementioned Na-montmorillonite aqueous dispersion was heated to 50° C. and, while stirring strongly, the abovementioned ammonium salt was added gradually, and a coagulated material was produced. After stirring for 3 hours at room temperature, the coagulated material was collected by filtration and washed with ethanol and hot water. After washing with hot water the material was freeze dried. Cyanobiphenyloxyundecylammonium organized montmorillonite in the form of a powder which had been dried for a further 5 hours at 80° C. (referred to below as BPCN-M) was obtained.

Compositing BPCN-M with a Liquid Crystal

Figure 9:
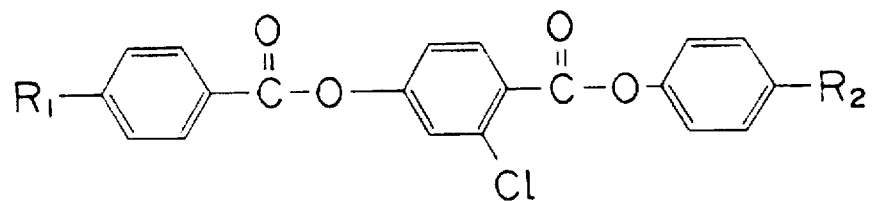
Figure 10:
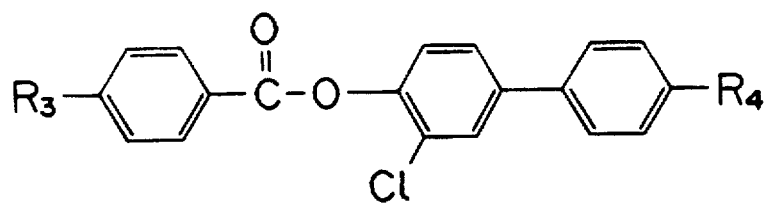
Figure 11:
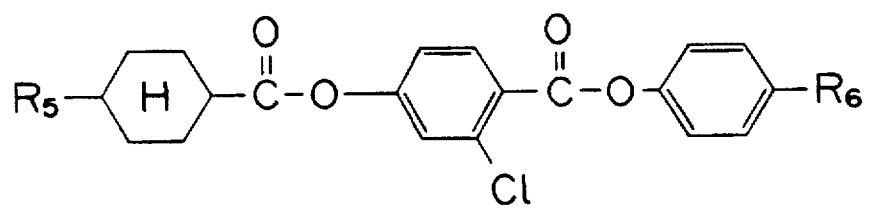
Figure 12:
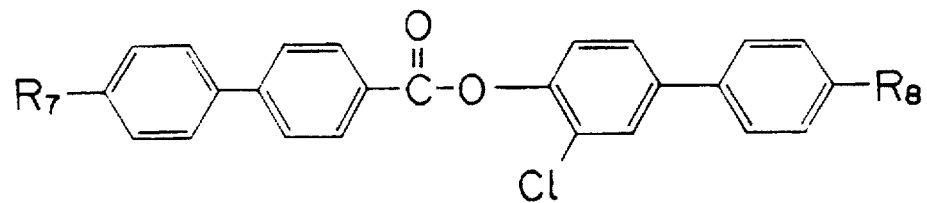
Figure 13:
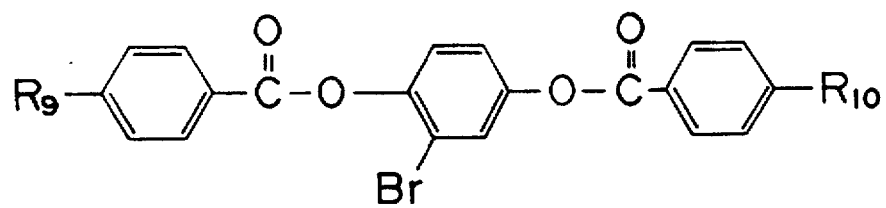
Figure 14:
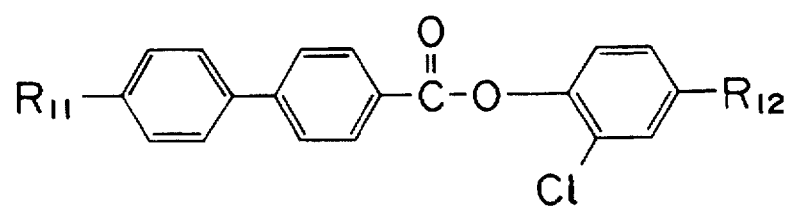
Figure 15:
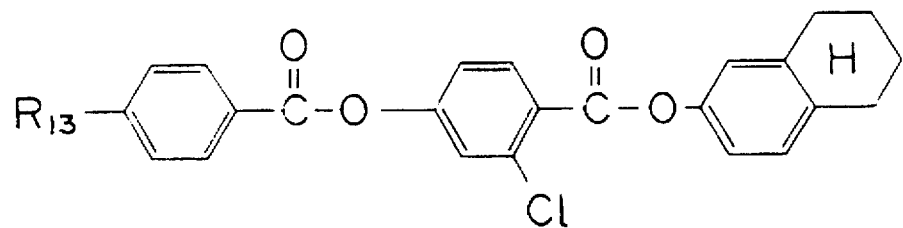
Figure 16:
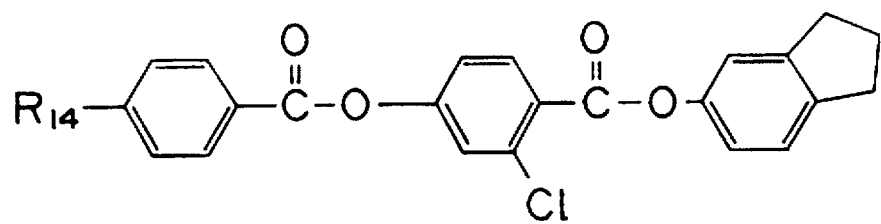
Figure 17:
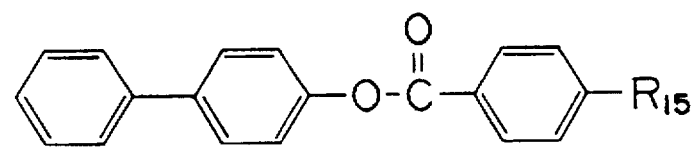
Figure 21:
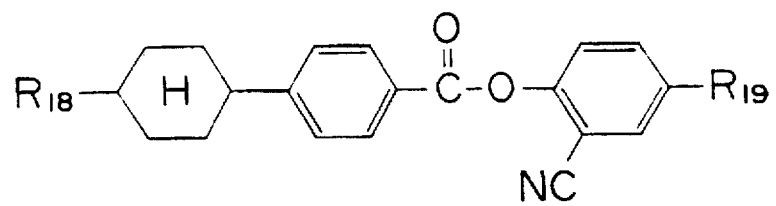
Figure 22:
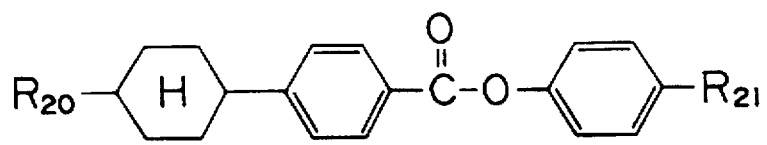
Figure 23:
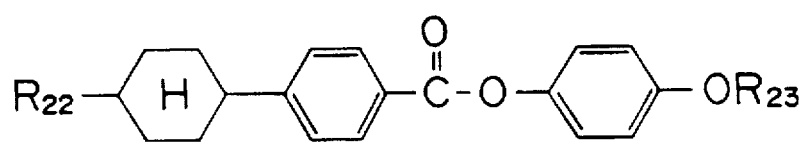
Figure 24:
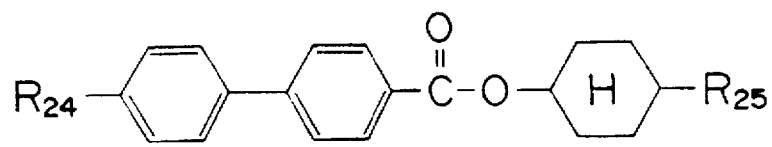
Figure 25:
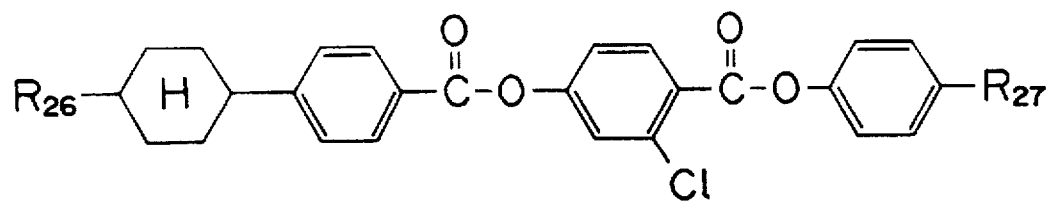
Figure 26:
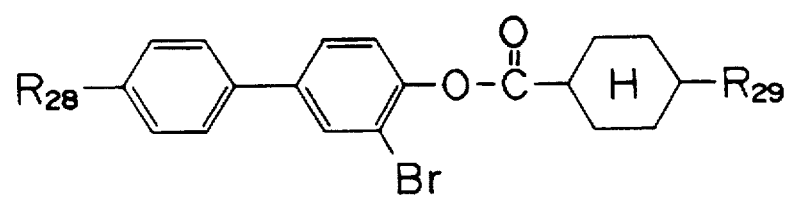
Figure 27:
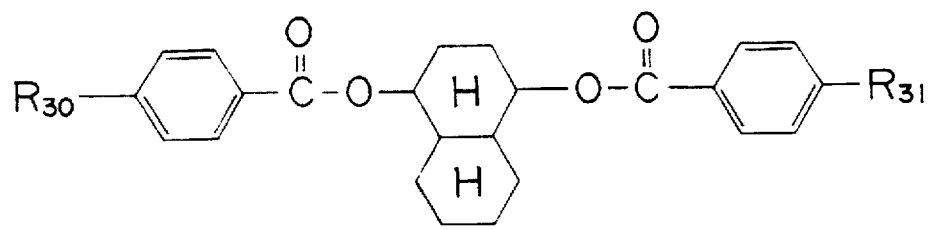
Figure 28:
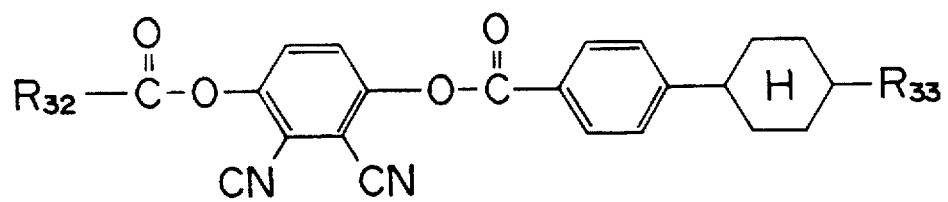
Figure 29:
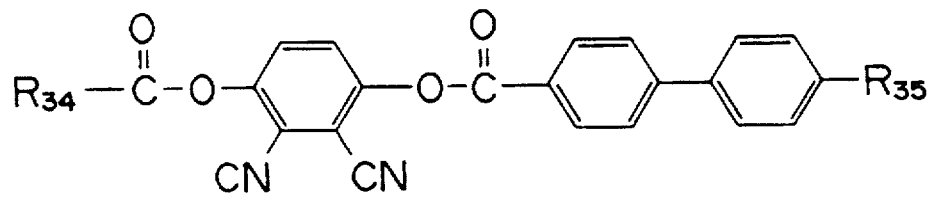
Figure 30:
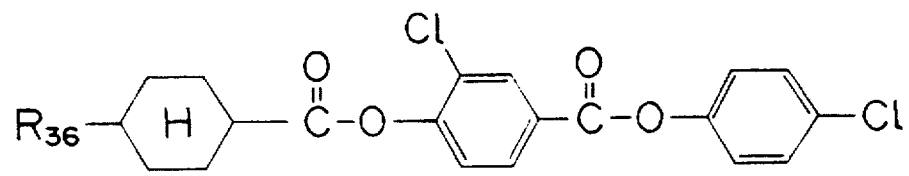
Figure 31:
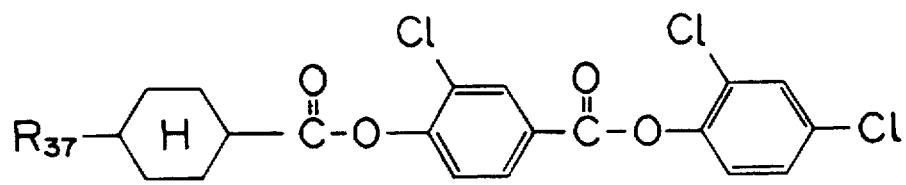
Figure 32:
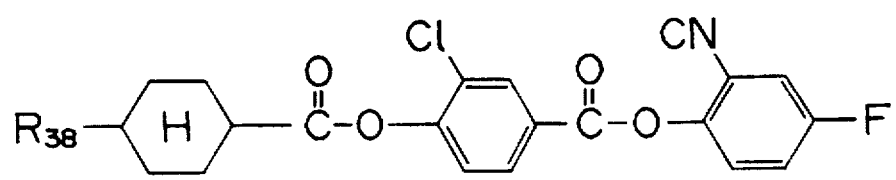
Figure 33:
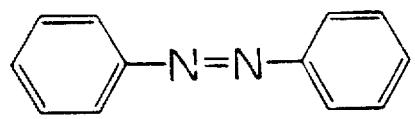
Figure 34:
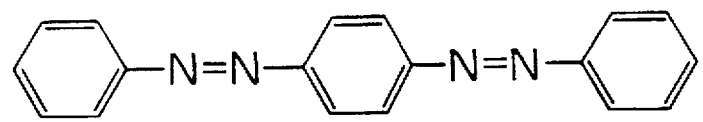
Figure 35:
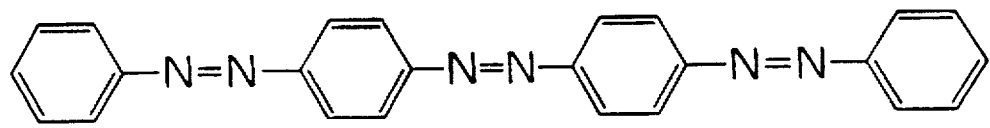
Figure 36:
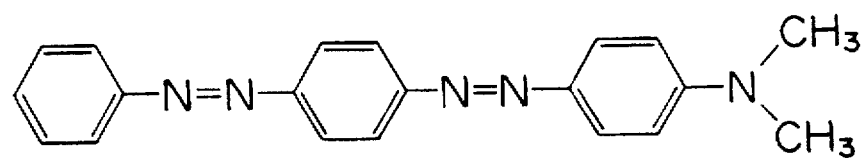
Figure 45:
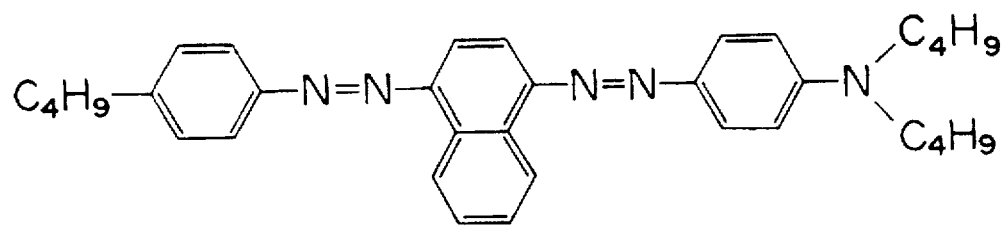
Figure 46:
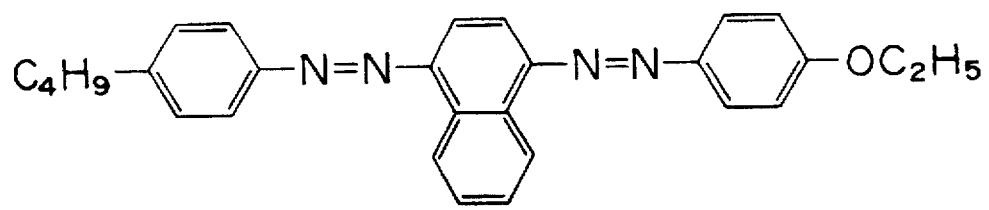
Figure 47:
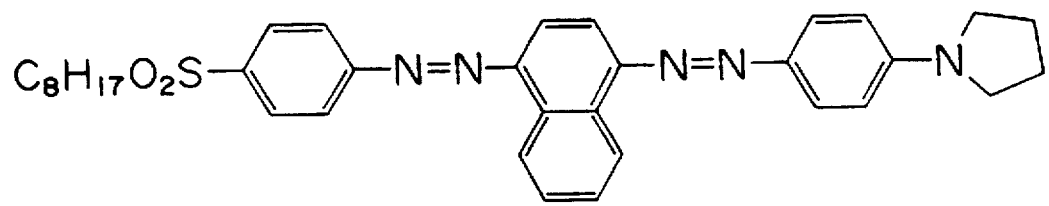
Figure 48:
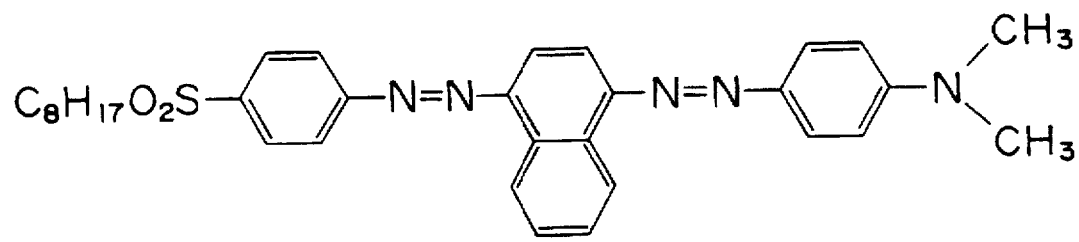
Figure 49:
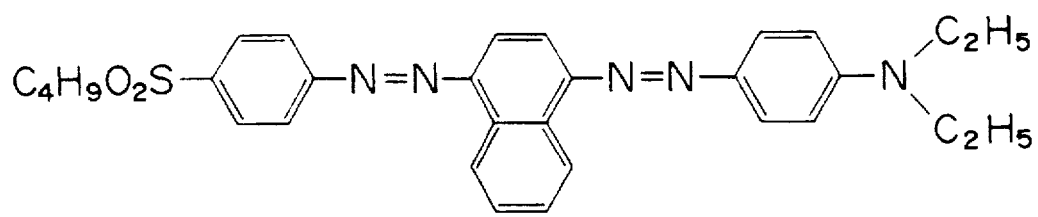
Figure 50:
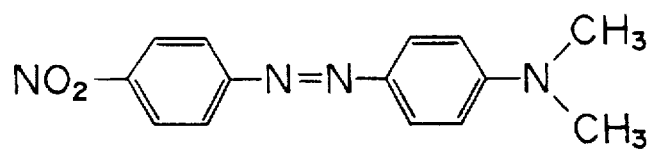
Figure 51:
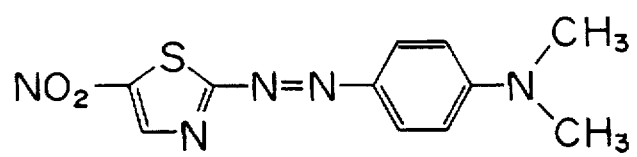
Figure 52:
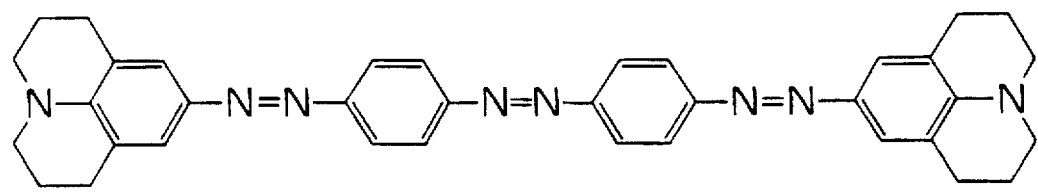
Figure 53:
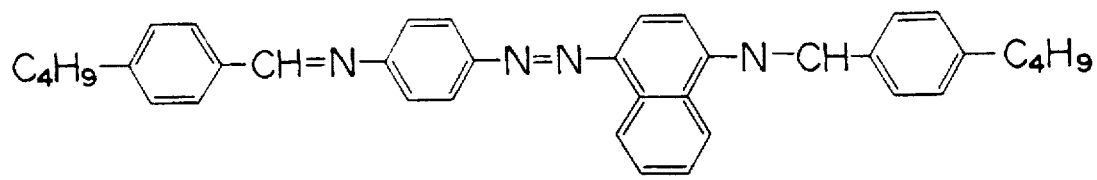
Figure 54:
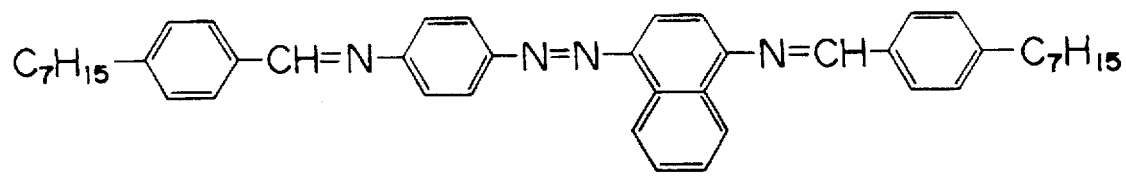
Figure 55:
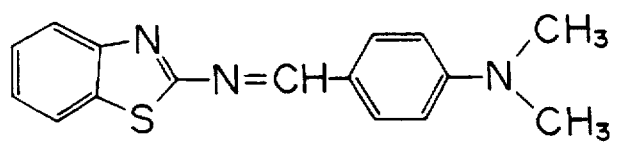
Figure 56:
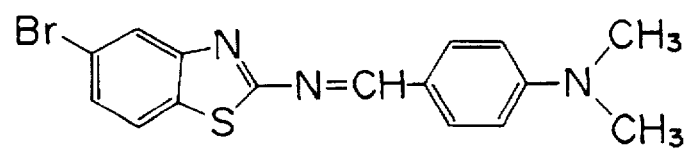

A nematic liquid crystal (KLC) comprising a mixture of equal amounts of the liquid crystal with n=4 and m=4 in the aforementioned FIG. 9 and the liquid crystal of n=6 and m=7 in FIG. 9 was prepared and, after dissolving or dispersing this and the aforementioned BPCN-M respectively in DMAc (N,N-dimethylacetamide), the two were mixed together and the DMAC was distilled off by heating under vacuum to prepare a liquid crystal composition of the first invention.

The amount of BPCN-M added was set at 2% by weight on an inorganic basis with respect to the liquid crystal composition.

Polarized Optical Microscope Observation

The approximate dispersed particle size of the BPCN-M in the liquid crystal composition was measured by observing the abovementioned liquid crystal composition in an isotropic state with crossed Nicols using a Model BHS-P polarized optical microscope manufactured by Olympus Optical Industries. The results are shown in Table 1.

Preparation of a Liquid Crystal Cell

The liquid crystal composition 8 of this example was sealed between a pair of transparent glass substrates 10 to which ITO had been attached with polymer beads 9 of diameter 12 μm as a spacer to form a liquid crystal cell 11, as shown in FIG. 6.

Measurement of Light Transmittance

A diagrammatic representation of the apparatus used for the measurement of light transmittance is shown in FIG. 7. In the apparatus shown in FIG. 7, a polarized optical microscope 12 (a Model BHS-P manufactured by Olympus Optical Industries with the polarizer and the analyzer removed was used) was used for the optical system and the halogen lamp fitted to the polarized optical microscope 12 was used for the light source 13. The transmitted light was detected using the photomultiplier 14 (a R-1547 photoelectric amplifying tube manufactured by Hamamatsu Photonics).

The output current of the photomultiplier 14 was converted to a voltage by connecting a 200 kΩ resistance in series and read off using a pen recorder. Here, the light transmitted (%) while the electric field of each frequency was being applied and after the applied voltage had been removed (in the memory states) was obtained by calculation in the following way.

Thus, the output value of the abovementioned photomultiplier was read off 9 seconds after applying or removing the voltage (photomultiplier A value) and then the photomultiplier output value under the same conditions using a blank cell in which water had been sealed were read off (photomultiplier B values), and the percentage of the photomultiplier A value with respect to the photomultiplier B value was obtained, which is to say:

TABLE 1

| | | | | | Transmitted Light of the Cell (%) | | | |
| | Two Frequency Addressing Liquid Crystal | Organized Layered Clay Mineral (Amount added, %) | Particle Size of the Clay Mineral (μm) | Initially | After Applying The Electric Field Where The Dielectric Anisotropy Is Positive | After Applying The Electric Field Where The Dielectric Anisotropy Is Negative | Retention Factor (M1, %) | Retention Factor (M2, %) |
|---|---|---|---|---|---|---|---|---|
| Example 1 | KLC | BPCN-M 2.0 | <3 | 23 | 79 (100 V-60 Hz) | 23 (100 V-20 kHz) | 72 | 81 |
| Example 2 | KLC | BPCN-M 1.0 | <3 | 40 | 91 (100 V-60 Hz) | 48 (100 V-20 kHz) | 40 | 122 |
| Example 4 | DF-01 | BPCN-M 2.0 | <3 | 18 | 63 (100 V-60 Hz) | 16 (100 V-40 kHz) | 71 | 89 |
| Example 5 | DF-02 | BPCN-M 2.0 | <3 | 11 | 56 (100 V-60 Hz) | 14 (100 V-40 kHz) | 46 | 110 |
| Comparative Example 1 | KLC | BPCN-M 0.5 | <3 | 46 | 92 (100 V-60 Hz) | 58 (100 V-20 kHz) | 19 | 0 |
| Comparative Example 2 | KLC | 0 | <3 | >95 | >95 (100 V-60 Hz) | >95 (100 V-20 kHz) | 0 | 0 |
| Comparative Example 3 | Liquid Crystal of which the Dielectric Anisotropy is Positive K-15 | BPCN-M 2.0 | <3 | 10 | 91 (80 V-60 Hz) | 91 (100 V-20 kHz) | 68 | 0 |
| Example 6 | DF-02 | BPCN-M 2.0 | <3 | 20 | 60 (30 V-60 Hz) | 7 (70 V-2 KHz) DS Mode | 84 | 97 |

$$\text{Light Transmitted (\%)} = 100 \times \text{Photomultiplier A value/photomultiplier B value} \quad (1)$$

The commercial power supply (100 V–60 Hz) with the voltage adjusted using a Slidac was used for applying an electric field of the low frequency region 1. Furthermore, a power amplifier Model S-4750 manufactured by the NF Electronic Instruments Co. was used for applying the high frequency region 2 electric field. The wave form of the applied voltage here was rectangular.

The electro-optical response of the liquid crystal cell 11 and the blank cell were evaluated in the following way.

Figure 2:
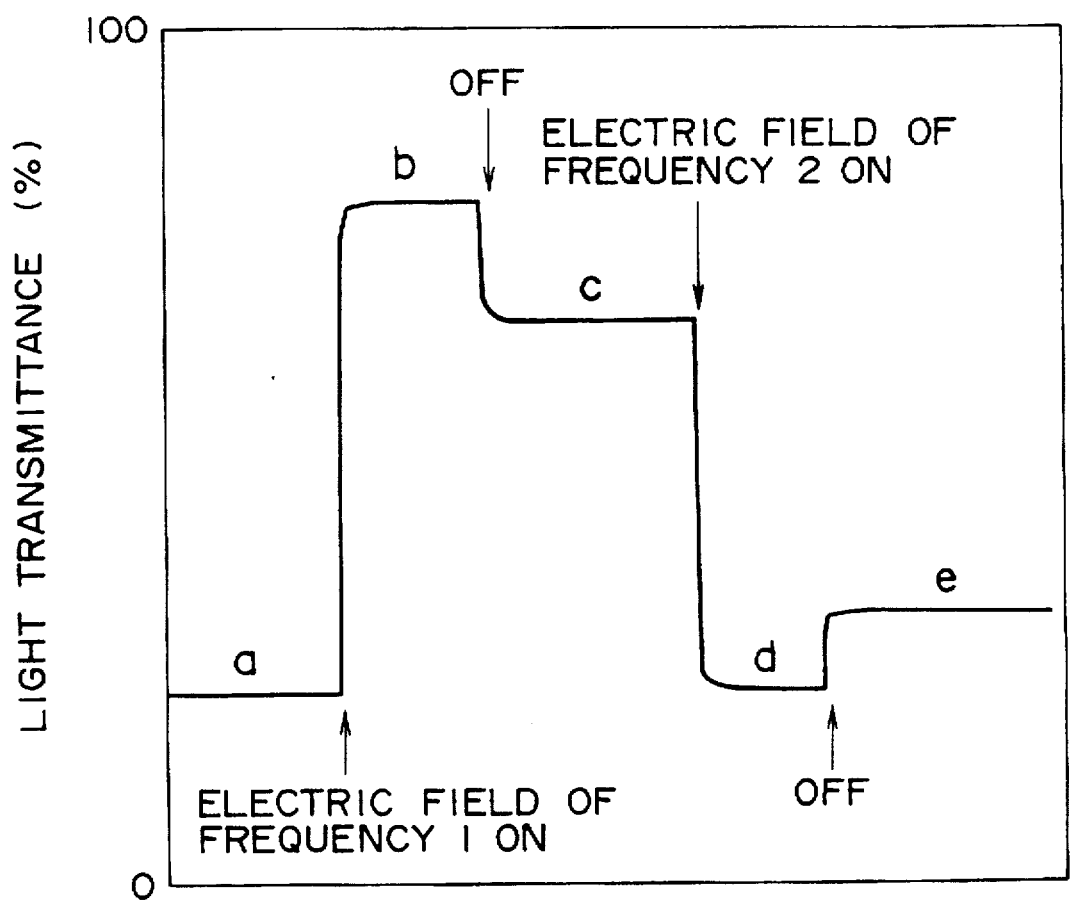
FIG. 2 shows the changes in light transmitted by a liquid crystal composition.
Figure 3A:
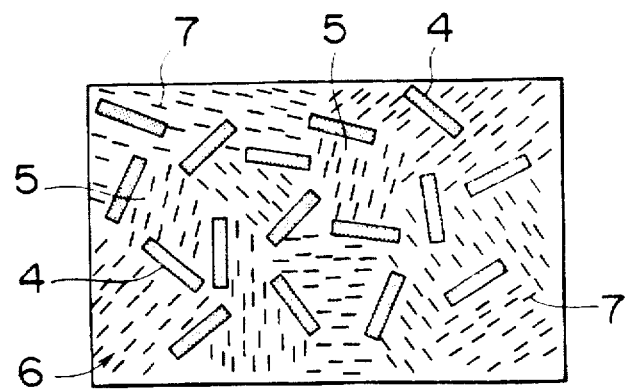
FIG. 3 is a diagrammatic representation of the states corresponding to changes in the light transmitted by a liquid crystal composition.
Figure 3B:
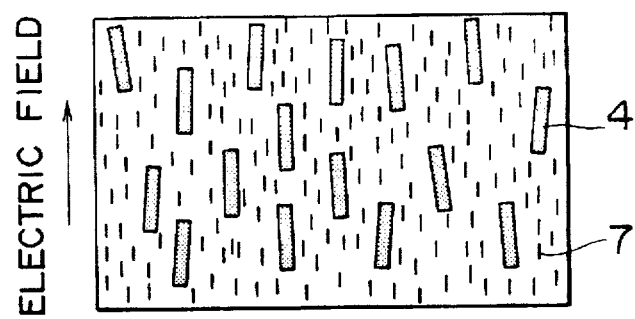
Figure 3C:
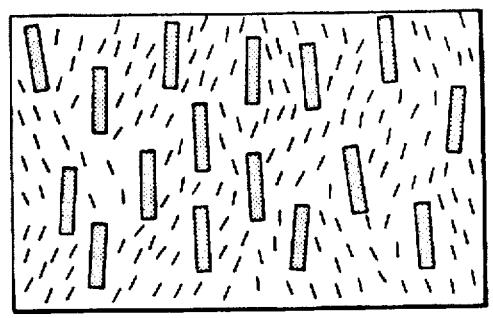
Figure 3D:
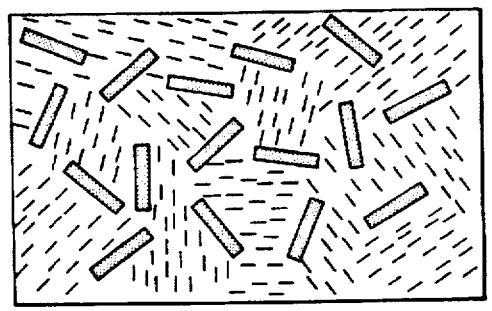

(1) The 100 V–60 Hz (sine wave) low frequency voltage was applied to the cell in the initial state (the state a of FIG. 2) to establish the state b of FIG. 2, and the applied voltage was removed after a few seconds to establish the first memory state, state c of FIG. 2.

(2) The 100 V–20 KHz (rectangular wave) high frequency was applied to the cell in the abovementioned memory state to establish state d of FIG. 2, and this voltage was removed after a few seconds to establish the second memory state, state e of FIG. 2.

Figure 8:
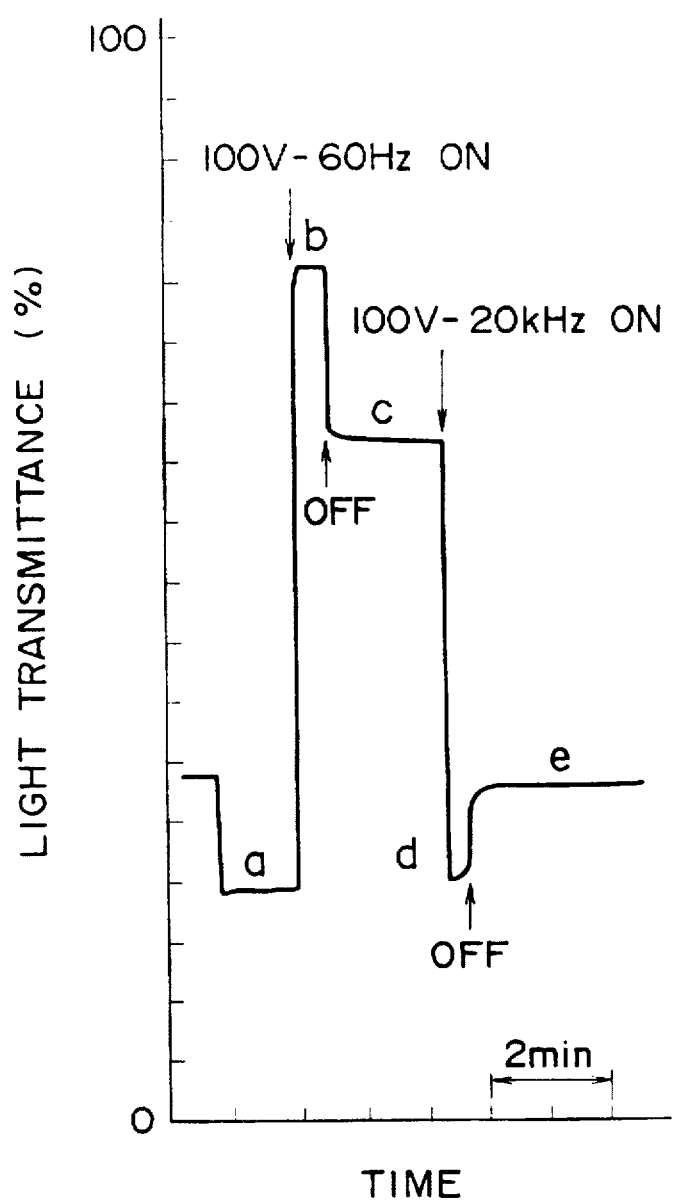
FIG. 8 is a graph which shows an example of the measured electric field responsiveness of the change in transmitted light in an actual example.

The change in light transmitted by the liquid crystal cell 11 measured in this way is shown in FIG. 8. On the basis of the light transmitted in each of the states a to e in FIG. 8, the memory intensity for the first memory state (state c) can be represented by:

$$\text{Retention Factor } M1 = (c-a) \times 100/(b-a) \quad (2)$$

and the memory capacity for the second memory state (stage e) can be represented by:

$$\text{Retention Factor } M2 = (c-e) \times 100/(c-d) \quad (3)$$

and these are shown in Table 1.

As is clear from Table 1 and FIG. 8, the retention factors M1 and M2 which represent the memory capacity both had a high value on simply switching the liquid crystal cell 11 between the light scattering state and the light transmitting state. The response rate on applying the electric field was within 100 ms in both cases and higher speed switching was possible compared with the response rate of 1 to 3 seconds of the low molecular weight liquid crystal-high molecular weight liquid crystal composites disclosed in the prior art (T. Kajiyama et al., Chemistry Letters, pp. 817–820, 1989)

EXAMPLE 2

Tests were carried out in the same way as in Example 1 except that 0.0073 grams of BPCN-M (inorganic content 0.96% by weight with respect to the total weight of the liquid crystal composition) with respect to 0.537 grams of the same mixed liquid crystal as in Example 1 were used. The test results are shown in Table 1.

Comparative Example 1

Tests were carried out in the same way as in Example 1 except that 0.0035 grams of BPCN-M (inorganic content 0.50% by weight with respect to the total weight of the liquid crystal composition) with respect to 0.505 grams of the same mixed liquid crystal as in Example 1 were used. The test results are shown in Table 1.

EXAMPLE 3

Tests were carried out in the same way as in Example 1 except that 0.0050 grams of the aforementioned dichroic dye shown in FIG. 44 was also added to the liquid crystal composition of Example 1. The test results are shown in Table 1.

EXAMPLE 4

Tests were carried out in the same way as in Example 1 except that the cell was prepared in such a way that the inorganic content was the same as in Example 1 using LIXON DF-01XX manufactured by Chisso Petrochemicals for the liquid crystal. The test results are shown in Table 1.

EXAMPLE 5

Tests were carried out in the same way as in Example 1 except that the cell was prepared in such a way that the inorganic content was the same as in Example 1 using LIXON DF-02XX manufactured by Chisso Petrochemicals for the liquid crystal. The test results are shown in Table 1.

EXAMPLE 6

Tests were carried out in the same way as in Example 1 except that 0.0810 mg of n-tetrabutylammonium chloride were added as an ionic component to the liquid crystal composition of Example 1 and it was driven in the DS mode. The test results are shown in Table 1.

EXAMPLE 7

Synthesis of Layered Inorganic-Organic Polymer n-Octadecyltriethoxysilane (6 grams) and magnesium chloride hexa-hydrate (3 grams) were dissolved in ethanol (150 ml). A methanol solution mixed with sodium hydroxide (1.7 grams) and water (4 grams) (100 ml) was then added and the mixture was stirred for 5 hours at room temperature. The white solid which precipitated out was recovered by filtration and washed twice with ethanol and three times with distilled water, and the inorganic salts such as sodium chloride were removed. It was then dried under vacuum overnight and a layered inorganic-organic polymer was obtained in the form of a white powder.

Compositing the Liquid Crystal and Layered Inorganic-Organic Polymer

The layered inorganic-organic polymer (0.040 grams) was dispersed in toluene (2 grams) using an ultrasonic treatment. A two frequency addressing liquid crystal (9.96 grams, LIXON DF05-XX, manufactured by Chisso Petrochemicals) and n-tetrabutylammonium chloride (0.02 mg) were added to, and mixed with, this dispersion. Next, the toluene was distilled off under vacuum to prepare a liquid crystal composition of the seventh aspect. The amount of layered inorganic-organic polymer added was set at 4 wt % with respect to the liquid crystal composition.

A liquid crystal cell was prepared in the same way as in Example 1 using the abovementioned liquid crystal composition and the light transmitted was measured in the same way as in Example 1. The results were such that, as shown in Table 2, in this example the transparency on applying a low frequency voltage was better than that in Example 1. Moreover, the fall in light transmitted after removing the electric field was small and the memory characteristics were also better than those in Example 1.

EXAMPLE 8

This example differed only in that the amount of layered inorganic-organic polymer added when compositing liquid crystal and layered inorganic-organic polymer in the same way as in Example 7 was set to 5 wt % with the respect to the liquid crystal composition. On evaluation this was virtually the same as Example 7.

TABLE 2

| | Two Frequency Addressing Liquid Crystal | Layered Inorganic-Organic Polymer (Amount added, %) | Particle Size of the Layered Inorganic-Organic Polymer (μm) | Transmitted Light of the Cell (%) | | | Retention Factor (M1, %) | Retention Factor (M2, %) |
|---|---|---|---|---|---|---|---|---|
| | | | | Initially | After Applying The Electric Field Where The Dielectric Anisotropy Is Positive | After Applying The Electric Field Where The Dielectric Anisotropy Is Negative | | |
| Example 7 | DF-05 | 4.0 | <5 | 72 | 94 (40 V-60 Hz) | 12 (80 V-1 kHz) DS Mode | 100 | 83 |
| Example 8 | DF-05 | 5.0 | <5 | 60 | 85 (40 V-60 Hz) | 10 (80 V-1 kHz) DS Mode | 100 | 91 |

Comparative Example 2

Tests were carried out in the same way as in Example 1 except that only the same liquid crystals as used in Example 1 was included and the liquid crystal cell was filled without including organized clay. The test results are shown in Table 1.

Comparative Example 3

Tests were carried out in the same way as in Example 1 except that the liquid crystal 4-pentyl-4'-cyanobiphenyl (K-15) which is not a two frequency addressing liquid crystal and which exhibits positive dielectric anisotropy was used. The test results are shown in Table 1.

Evaluation of the Examples and Comparative Examples

As shown in Examples 1, 2, 4, 5 and 6, the liquid crystal compositions of this invention are in an opaque light scattering state in the initial state after packing the cell and before applying a voltage, and the light transmitted is at a low level.

Then they become transparent on applying a prescribed low frequency voltage and the light transmitted increases and, moreover, the transparency is maintained with good memory characteristics with a high retention factor after the applied voltage has been removed.

Furthermore, in this memory state, a light scattering state is achieved by applying the prescribed high frequency voltage in the electric field mode and the light scattering state is maintained with good memory characteristics with a high retention factor on removing the applied voltage.

On the other hand, in Example 6 the control of the electric field was in the DS mode, and in this case the light scattering intensity on removal in the memory state is at a higher level, and the light scattering state is maintained with a similar high retention factor.

However, as shown in Comparative Example 1, a satisfactory light scattering intensity is not realized when the amount of organized clay added is very small, and there is high light transmission in the initial state, and satisfactory memory characteristics are not seen in either the first or second memory states.

Next, as shown in Example 3, the visual contrast can be reinforced by adding dichroic dye. That is to say, in addition to light scattering in the initial state, there is also a light absorbing effect due to the dichroic dye and so this is a colored opaque state. On applying a low frequency voltage the coloration due to the dichroic dye disappears on transition from a light scattering state to a transmitting state and the cell becomes colorless and transparent. On applying a high frequency voltage in the electric field mode it reverts to light scattering and the cell is in the same state as the colored initial state. The first memory state and the second memory state are stable.

As shown in Comparative Example 2, no light scattering effect is produced at all when no organized clay mineral is included in the liquid crystal, and light control is impossible.

As shown in Comparative Example 3, the memory state does not disappear when the high frequency voltage is applied when the liquid crystal exhibits positive dielectric anisotropy.

What is claimed is:

1. A liquid crystal composition comprising:
   low molecular weight liquid crystal molecules which respond to an electric field and exhibit a positive dielectric anisotropy or a negative dielectric anisotropy depending on the frequency of the electric field; and
   a plurality of flat shaped particles having an aspect ratio of at least two and an affinity with the liquid crystal, said particles being dispersed in the liquid crystal at a density such that liquid crystal domains are formed.

2. A liquid crystal composition according to claim 1, further comprising an ionic component.

3. A liquid crystal composition according to claim 1, further comprising a dichroic dye.

4. A liquid crystal composition according to claim 3, further comprising an ionic component.

5. A liquid crystal composition according to claim 1, wherein said flat shaped particles orient in response to an electric field.

6. A liquid crystal composition according to claim 5, further comprising an ionic component.

7. A liquid crystal composition according to claim 1, wherein said flat shaped particles are made of an organized layered clay mineral.

8. A liquid crystal composition according to claim 7, further comprising an ionic component.

9. A liquid crystal composition according to claim 1, wherein said flat shaped particles are made of a layered inorganic-organic polymer in which organic groups have been covalently bonded to an inorganic layered polymer.

10. A liquid crystal composition according to claim 9, further comprising an ionic component.

11. A liquid crystal composition according to claim 7, further comprising a dichroic dye, and wherein said flat shaped particles orient in response to an electric field.

12. A liquid crystal composition according to claim 9, further comprising an ionic component.

13. A liquid crystal composition according to claim 9, further comprising a dichroic dye, and wherein said liquid crystal molecules have low molecular weight, and said flat shaped particles orient in response to an electric field.

14. A liquid crystal composition according to claim 13, further comprising an ionic component.

15. The composition of claim 1, wherein said flat shaped particles have an aspect ratio of at least five.

* * * * *

UNITED STATES PATENT AND TRADEMARK OFFICE
CERTIFICATE OF CORRECTION

PATENT NO. : 5,766,508
DATED : June 16, 1998
INVENTOR(S) : Masaya KAWASUMI, et al.

It is certified that error appears in the above-identified patent and that said Letters Patent is hereby corrected as shown below:

Column 22, line 64, "9" should read --11--.

Signed and Sealed this

Second Day of February, 1999

Attest:

Attesting Officer

*Acting Commissioner of Patents and Trademarks*